United States Patent
Saltzstein et al.

(10) Patent No.: US 9,679,310 B1
(45) Date of Patent: Jun. 13, 2017

(54) ELECTRONIC DISPLAY WITH COMBINED HUMAN AND MACHINE READABLE ELEMENTS

(71) Applicant: Cocoanut Manor, LLC, Seattle, WA (US)

(72) Inventors: William E. Saltzstein, Seattle, WA (US); Bernard J. Thompson, Bellevue, WA (US)

(73) Assignee: Cocoanut Manor, LLC, Seattle, WA (US)

( * ) Notice: Subject to any disclaimer, the term of this patent is extended or adjusted under 35 U.S.C. 154(b) by 100 days.

(21) Appl. No.: 14/734,892

(22) Filed: Jun. 9, 2015

Related U.S. Application Data

(60) Provisional application No. 62/010,208, filed on Jun. 10, 2014.

(51) Int. Cl.
G09G 5/00 (2006.01)
G06Q 30/02 (2012.01)
G06F 3/14 (2006.01)
G06F 3/041 (2006.01)
G09G 3/34 (2006.01)

(52) U.S. Cl.
CPC ......... *G06Q 30/0257* (2013.01); *G06F 3/041* (2013.01); *G06F 3/1423* (2013.01); *G06Q 30/0267* (2013.01); *G09G 3/344* (2013.01); *G09G 5/006* (2013.01); *G09G 2370/16* (2013.01); *G09G 2380/04* (2013.01)

(58) Field of Classification Search
USPC .......... 345/173, 213, 156, 1.2, 211; 715/740
See application file for complete search history.

(56) References Cited

U.S. PATENT DOCUMENTS

| | | | |
|---|---|---|---|
| 7,090,125 B2 | 8/2006 | Goel et al. |
| 7,283,036 B2 | 10/2007 | Chen |
| 7,413,121 B2 | 8/2008 | Goel et al. |
| 8,061,600 B2 | 11/2011 | Goel et al. |

(Continued)

FOREIGN PATENT DOCUMENTS

| EP | 2530582 A1 | 12/2012 |
| WO | WO 2005/060699 A2 | 7/2005 |

OTHER PUBLICATIONS

Google Beacons, "Platform Overview", https://developers.google.com/beacons/overview, Sep. 11, 2015 in 4 pages.

(Continued)

*Primary Examiner* — Thuy Pardo
(74) *Attorney, Agent, or Firm* — Knobbe, Martens, Olson & Bear, LLP

(57) ABSTRACT

Electronic displays devices can present electronically changeable displayed images including graphical and textual elements, for example, human and machine-readable elements. The devices can include a low-power-consumption display that uses little or no power until a portion of the display is changed. The electronic display devices can be wirelessly connected to computing devices such as portable computing devices (e.g., smartphones, smartwatches, tablets, laptops, etc.) and fixed gateway devices (e.g., wireless access points) by a wireless communications network. The devices can include a motion sensor and functionality for determining identity, proximity, and/or location of the device.

43 Claims, 24 Drawing Sheets

(56) References Cited

U.S. PATENT DOCUMENTS

| | | | |
|---|---|---|---|
| 8,313,025 B2 | 11/2012 | Saxena et al. | |
| 8,432,846 B2 | 4/2013 | Guo et al. | |
| 8,577,728 B2 | 11/2013 | Jones et al. | |
| 8,870,056 B2 | 10/2014 | Goel et al. | |
| 9,204,291 B2 | 12/2015 | Jackson et al. | |
| 2002/0158889 A1 | 10/2002 | Sameshima et al. | |
| 2003/0017846 A1 | 1/2003 | Estevez et al. | |
| 2005/0289631 A1 | 12/2005 | Shoemake | |
| 2006/0202925 A1* | 9/2006 | Manning | G02F 1/13476 345/87 |
| 2007/0164980 A1* | 7/2007 | Manning | G06F 3/147 345/104 |
| 2010/0053175 A1 | 3/2010 | Tashjian | |
| 2011/0084900 A1 | 4/2011 | Jacobsen et al. | |
| 2011/0140993 A1* | 6/2011 | Bess | G06F 3/147 345/2.3 |
| 2013/0084796 A1 | 4/2013 | Kerr | |
| 2013/0141331 A1 | 6/2013 | Shiu et al. | |
| 2013/0314312 A1* | 11/2013 | Gruhlke | G06F 3/0421 345/156 |
| 2014/0108084 A1 | 4/2014 | Bargetzi et al. | |
| 2015/0042540 A1 | 2/2015 | Goel et al. | |
| 2015/0309543 A1 | 10/2015 | Bleistern | |
| 2015/0346987 A1* | 12/2015 | Ren | G06F 1/32 345/589 |
| 2015/0350296 A1* | 12/2015 | Yang | H04L 67/025 715/740 |
| 2015/0364115 A1* | 12/2015 | Yaras | G09G 5/18 345/213 |
| 2016/0227381 A1* | 8/2016 | Bargetzi | H04W 4/06 |

OTHER PUBLICATIONS

Google Beacons, "Mark up the world using beacons," https://developers.google.com/beacons/, Mar. 5, 2016 in 6 pages.

Aruba Networks, Data Sheet—"Aruba 330 Series Access Points," Jun. 15, 2016, in 10 pages.

Aruba Networks, Data Sheet—"Aruba Location Services", Apr. 18, 2016, in 7 pages.

Tile Inc., "Never Lose Your Keys, Wallet or Anything Again," www.thetileapp.com, accessed Jun. 20, 2016 in 5 pages.

Tile Inc., "How It Works—Never Lose Your Keys, Wallet or Anything Again," www.thetileapp.com/how-it-works, accessed Jun. 20, 2016 in 9 pages.

Estimote, Inc., "Estimote Beacons—Real-world context for your apps," http://estomote.com, accessed Jun. 20, 2016 in18 pages.

reelyActive "reelyActive: Smart Spaces put Things in context," http://context.reelyactive.com/, accessed Jun. 20, 2016 in 4 pages.

SeeNote, "See what's important", http://docs.getseenote.com/, accessed May 2, 2016, in 2 pages.

SeeNote, "Pre-Order SeeNote Today", http://docs.getseenote.com/, accessed May 2, 2016, in 10 pages.

Omni-ID, Omni-ID View Tags Data Sheet DS0071-P, Apr. 2015, in 2 pages.

Decuir, Joe, "Bluetooth 4.0: Low Energy," CSR PLC, Nov. 2010, in 62 pages.

Eink, "Electronic Shelf Labels," http://www.eink.com/esl_tags.html, accessed May 18, 2015, in 3 pages.

Imagotag, "How Smart tagging works," http://www.imagotag.com/technology/smart-tagging-works/, accessed May 18, 2015, in 3 pages.

Kickstarter, "DISPLIO—WiFi display that tracks what's important to you," Draugiem Group, https://www.kickstarter.com/projects/914874115/displio-wifi-display-that-tracks-whats-important-t?ref=nav_search, accessed Jun. 26, 2015, in 7 pages.

Mbientlab Blog, "Bluetooth Low Energy Introduction," http://mbientlab.com/blog/bluetooth-low-energy-introduction/, Jan. 16, 2014, in 7 pages.

Pricer, "Electronic Shelf Labels (ESL)," http://www.pricer.com/en/Solutions/Electronic-Shelf-Labels/, accessed May 18, 2015, in 3 pages.

Saltzstein, Bill, "Bluetooth Breakthrough final—YouTube," uploaded Nov. 28, 2014, https://www.youtube.com/watch?v=F7VVqPIESLI&feature=youtube, in 1 page.

The Drum, "NFC is dead, long live Bluetooth LE," http://www.thedrum.com/opinion/2013/12/26/nfc-dead-long-live-ble, Dec. 26, 2013, in 3 pages.

"iBeacon," from Wikipedia, accessed Jun. 5, 2015, in 8 pages.

eNote, "Introducing eNote," http://www.enote.ink/, accessed May 26, 2015, in 3 pages.

Engadget, "popSLATE gives your iPhone a second (not so useful) screen," http://www.engadget.com/2015/04/22/popslate-gives-your-iphone-a-second-not-so-useful-screen/, Apr. 22, 2015, in 8 pages.

Fashionteq, "Zazzi," http:/www.fashionteq.com/, accessed Jun. 26, 2015, in 4 pages.

* cited by examiner

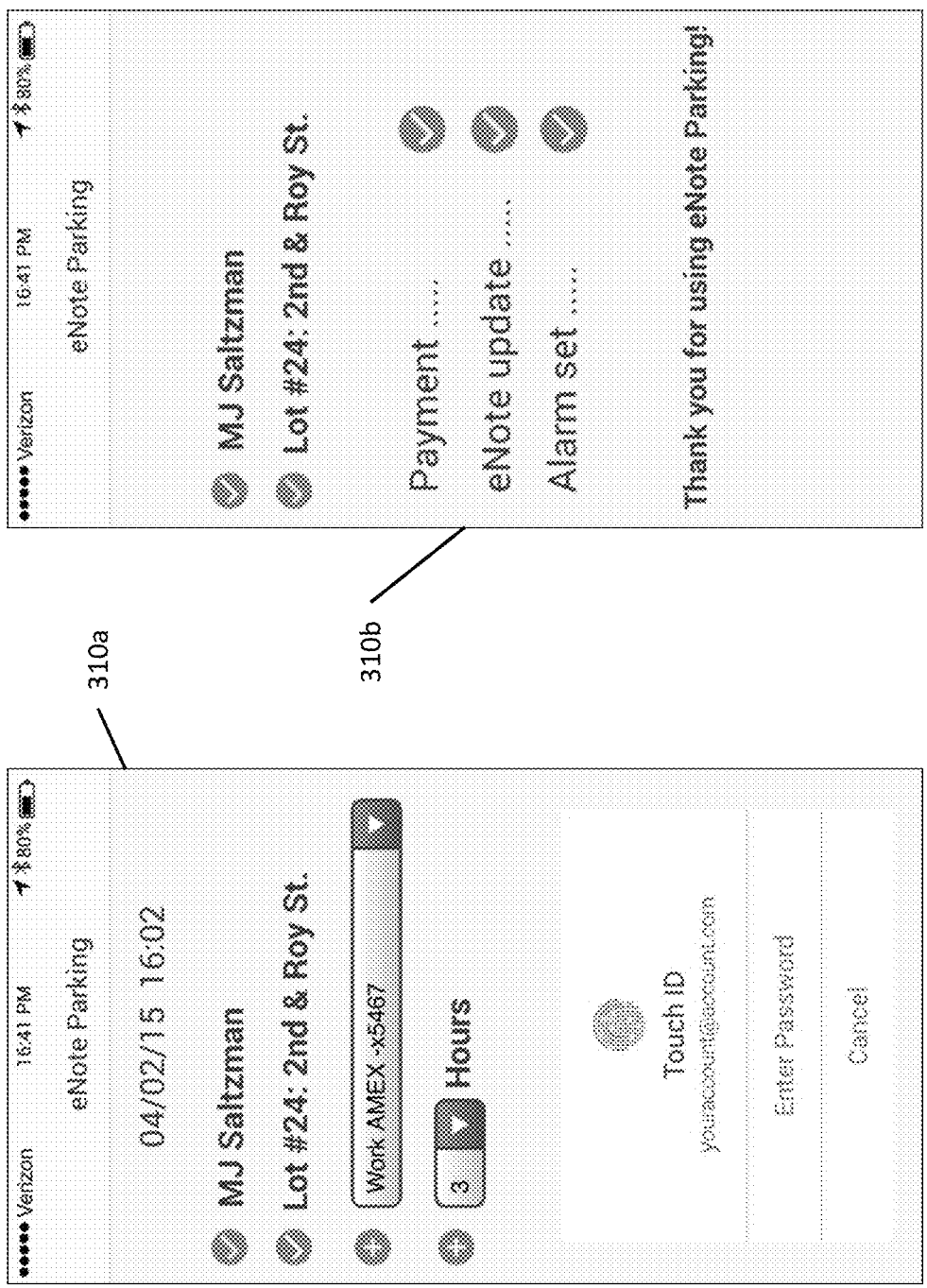

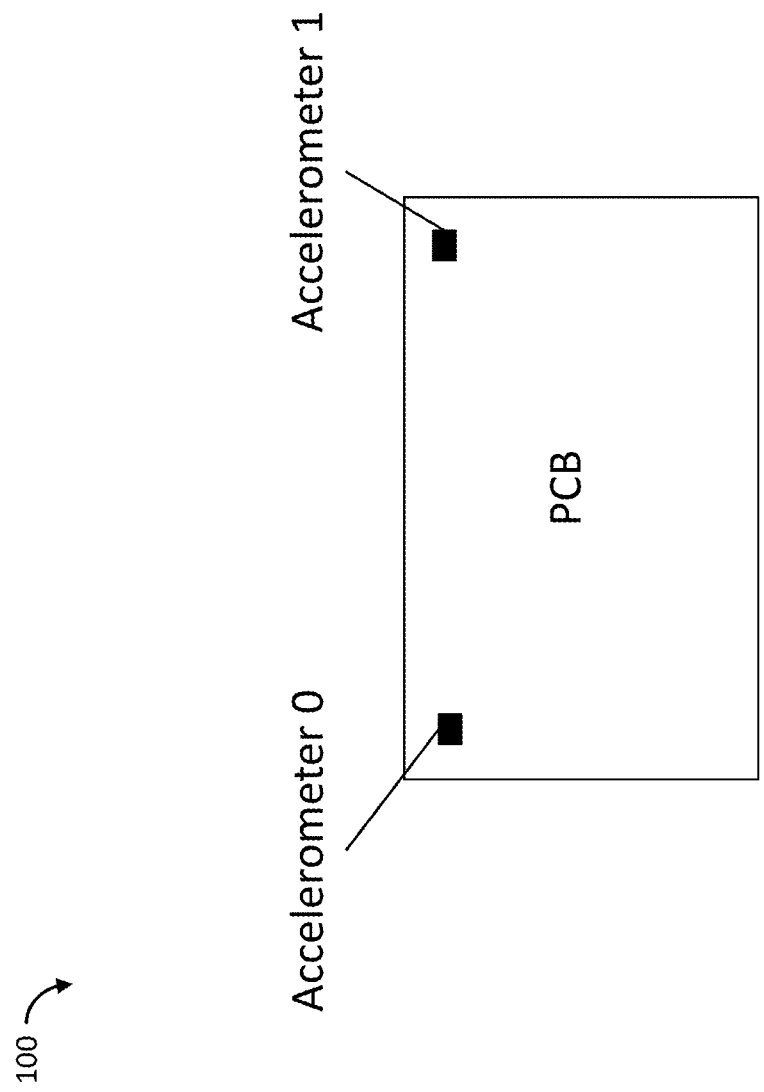

ELECTRONIC DISPLAY WITH COMBINED HUMAN AND MACHINE READABLE ELEMENTS

CROSS-REFERENCE TO RELATED APPLICATIONS

This application claims the benefit of priority to U.S. Provisional Patent Application No. 62/010,208, filed Jun. 10, 2014, entitled "ELECTRONIC DISPLAY WITH COMBINED HUMAN AND MACHINE READABLE ELEMENTS," which is hereby incorporated by reference herein in its entirety.

BACKGROUND

Field

The present disclosure relates to the field of electronic displays utilizing technologies for electronically changeable displayed images including graphical and/or textual elements.

Description of the Related Art

Electronic displays are output devices for presentation of text or images for visual reception by an observer. Electronic displays may present visual information according to an electrical input signal (analog or digital) either by emitting light (sometimes called active displays) or, alternatively, by modulating available light during the process of reflection or transmission (sometimes called passive displays).

SUMMARY

An embodiment of a wireless electronic display device comprises a wireless radio frequency transceiver configured to communicate bidirectionally with a first device and a second device, and a low-power-consumption electronic display that uses little or no electrical power to maintain an image on the electronic display. The electronic display can be configured to output (1) a human-readable element and (2) a machine-readable element. The electronic display can comprise a first area configured to display a first image based on first information received from the first device and a second area configured to display a second image based on second information received from the second device. The electronic display device can include a processor in communication with the electronic display and the transceiver, with the processor configured to operate substantially concurrently in a central mode and a peripheral mode. When in the central mode, the electronic display device acts as a master that initiates a connection to the first device and receives the first information from the first device via the connection, and when in the peripheral mode, the electronic display device acts as a slave that advertises to receive a connection request from the second device, and once connected receives the second information from the second device.

An embodiment of a wireless electronic display device comprises a wireless radio frequency transceiver, and a low-power-consumption electronic display that uses little or no electrical power to maintain an image on the electronic display. The electronic display can be configured to output (1) a human-readable element or (2) a machine-readable element. The electronic display device can include a first motion sensor and a processor in communication with the electronic display, the transceiver, and the first motion sensor. The processor can be configured to: receive a first vibration signal from the first motion sensor and analyze the first vibration signal to determine the occurrence of a tap on the electronic display device.

An embodiment of a wireless electronic display device comprises a wireless radio frequency transceiver and a low-power-consumption electronic display that uses little or no electrical power to maintain an image on the electronic display. The electronic display can be configured to output (1) a human-readable element or (2) a machine-readable element. The electronic display device can comprise a motion sensor and a processor in communication with the electronic display, the transceiver, and the motion sensor. The electronic display device can be configured to transmit a connectionless advertising event.

Details of one or more embodiments of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

FIGS. 3D-1 and 3D-2 show example user interfaces (UIs) by which a user can update parking information on the eNote display device of FIG. 3C, for example, to pay for additional parking time.

FIGS. 9A and 9C schematically illustrate example use cases for a bicycle and a refrigerator/freezer, respectively. FIGS. 9B and 9D schematically illustrate user interfaces that can be output on the display of the eNote device for the bicycle and refrigerator/freezer use cases, respectively.

FIGS. 10A and 10B schematically illustrate a top view (FIG. 10A) and a side cross-section view (FIG. 10B) of an embodiment of an eNote device including two accelerometers.

Figure 1A:
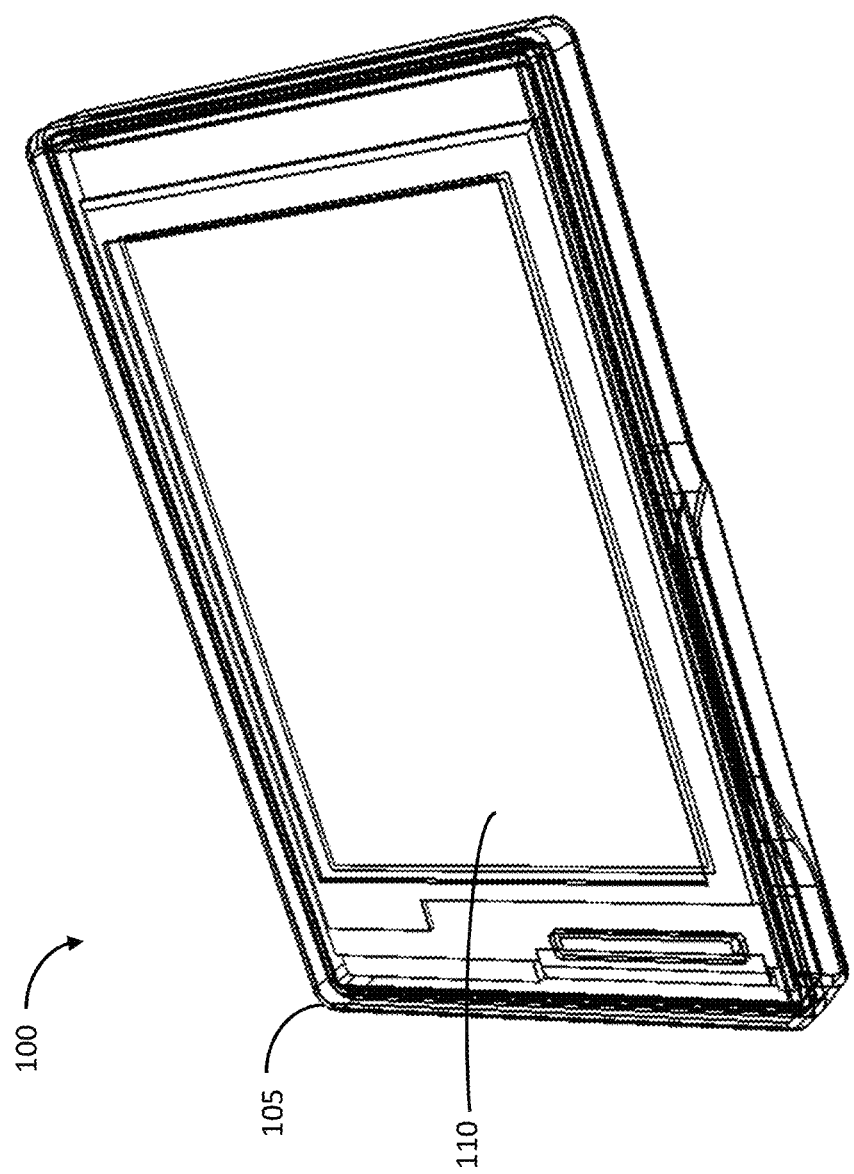
FIG. 1A shows an engineering implementation of an example eNote display device.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

The present disclosure relates to the field of electronic display devices utilizing technologies for electronically changeable displayed images including graphical and/or textual elements. Certain non-limiting, example, implementations of the electronic display devices will be referred to herein as eNote or an eNote display device. The electronic display devices can include a display that utilizes technologies such as electronic ink (e.g., eInk or ePaper electrophoretic displays available from e Ink Corp., Billerica, Mass.), liquid crystal displays (LCD), or microelectromechanical systems displays (e.g., interferometric modulator displays such as a Mirasol display available from Qualcomm, Inc., San Diego, Calif.). Certain embodiments utilize low power-consumption reflective or transflective displays that can hold images (which may include static text or graphics) without electrical power (e.g., bistable displays), which typically only use power when changing the text or image. For example, the electronic display may use no electrical power (e.g., no current) when maintaining an image on the display and use only a relatively small amount of electrical power (e.g., a current less than 5-10 mA at 3 V) when changing or updating the image. In some implementations, the eNote device can be configured to receive user information e.g., via one or more buttons, via a touch sensor or a touch-sensitive display, or via detection of touches or taps using a motion sensor (e.g., an accelerometer, as described below). The electronic displays can be portable (e.g., lightweight and carried by hand) and have sizes less than about 30 cm by 30 cm (when viewed from the top of the device).

More specifically, this disclosure relates to various implementations of electronic displays that are connected to computing devices such as portable computing devices (e.g., smartphones, smartwatches, tablets, laptops, etc.) and gateway devices (e.g., wireless access points) by a wireless communications network. Those wireless connections can incorporate not only technology and methods for transfer of the data to be converted to images shown on the display, but also elements and technology that can be used to determine identification, proximity, and/or location. These elements can include optical or Radio Frequency (RF) methods for transmission of information. The communication can be bi-directional, e.g., between two or more eNote devices or between an eNote device and a gateway device, a portable computing device, etc.

In various embodiments, the eNote device is configured to provide bidirectional radio frequency (RF) wireless communication, for example, in the Industrial, Scientific, and Medical (ISM) ultrahigh frequency (UHF) band near 2.4 GHz (e.g., from about 2.4 GHz to about 2.483 GHz). The ISM band is reserved for purposes other than telecommunication (and does not require an FCC license), and in some such embodiments, the eNote device does not include telecommunications functionality (e.g., the device does not include a cellular transceiver). The wireless communication provided by the eNote device can include frequency hopping spread spectrum (FHSS) technology that can hop between different channels in the band (e.g., 1 MHz-wide channels). The wireless functionality can provide for data exchange over short distances in the ISM band. For example, various embodiments of the eNote device can include a wireless radio transceiver that can provide communications over ranges of about 1 m (e.g., powers up to about 1 mW), 10 m (e.g., powers up to about 2.5 mW), 50 m-75 m (e.g., powers up to about 10 mW) or 100 m or more (e.g., powers up to about one to a few hundred mW). The data rates provided by the transceivers can be from a few Mbit/s to 30 (or more) Mbit/s.

The combination of human and machine-readable elements allows for precise identification for initiating communication and encryption (including pairing) as well as confirmation of location and to establish micro-geographical location in environments and applications where technologies like Global Positioning Satellite (GPS) technology either cannot operate or cannot provide sufficient spatial resolution.

Human readable information can be provided using text composed of black and white image elements (e.g., pixels) arranged in a matrix (sometimes called a bit map) and can be composed in any language or character set. Machine-readable information can be provided graphically or through the wireless interface. Graphical visual elements can utilize one-dimensional and two-dimensional patterns (e.g., bar codes or quick response (QR) codes), which are machine-readable using cameras or software in smartphones and tablet computers.

Example eNote Display Devices and Example eNote Systems

Figure 1B:
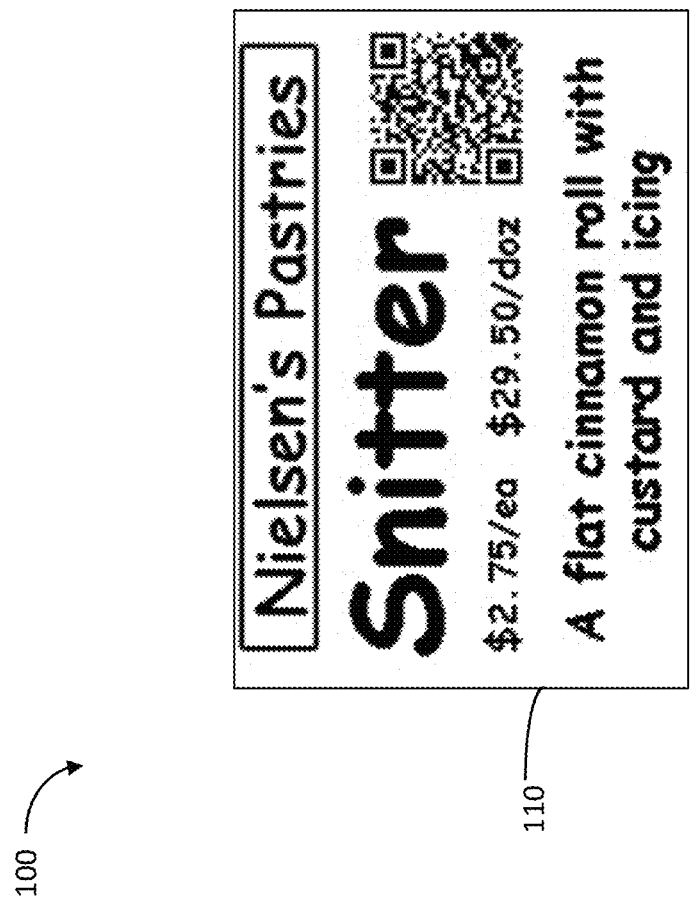
FIG. 1B shows an electronic shelf label (ESL) implementation of an eNote display device in which the display shows text and graphics.

FIG. 1A shows an engineering implementation of an embodiment of an eNote display device 100. The eNote device 100 includes a body 105 and a display 110 that can be used to output text and/or graphics (e.g., human-readable and/or machine-readable elements). The eNote display 100 may be used as an electronic shelf label (ESL) used by retailers to show product pricing on shelves in a retail store. FIG. 1B shows an ESL implementation of an eNote device 100 in which the display 110 shows text and graphics. In the example display 110, the displayed text shows a retailer (e.g., "Nielsen's Pastries"), a retail product (e.g., "Snitter"), pricing information (e.g., "$2.75/ea"), a product description (e.g., "A flat cinnamon roll . . . "), and the displayed graphics is a QR code for the product. In other example, the text and graphics layout of the eNote display can be different than shown in FIG. 1B.

Figure 2:
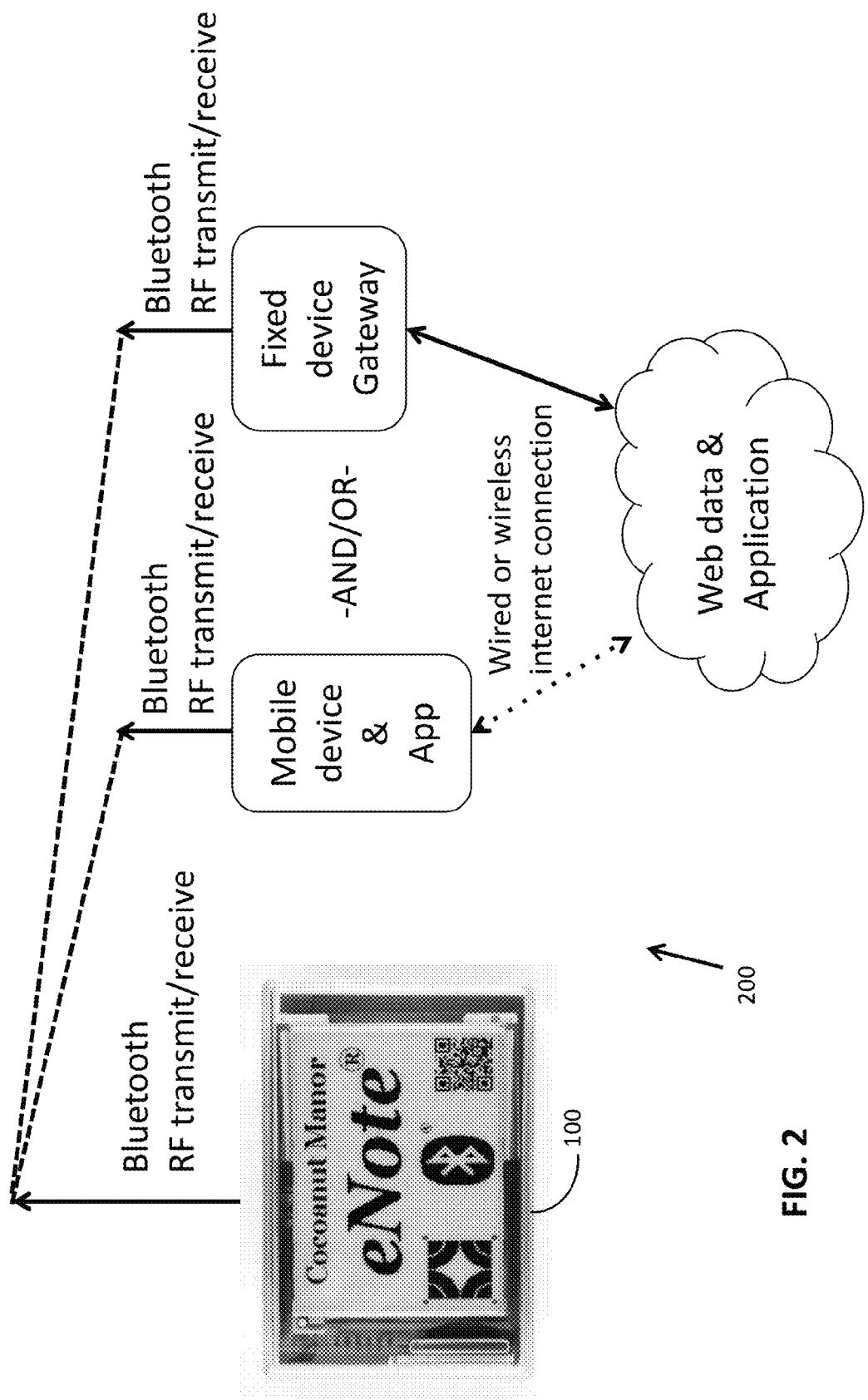
FIG. 2 is a schematic diagram of an example eNote system.

To achieve low cost and low power consumption, embodiments of the eNote display device 100 rely on compute and power intensive processing and transmission in the mobile device or in cloud computing applications rather than in the eNote display itself. FIG. 2 is a schematic diagram of an example system 200 including an eNote display device 100. In this example system 200, the eNote display device 100 uses an ePaper (e.g., bistable or multistable) display that utilizes little or no electrical power when the screen of the display is not updating. The eNote display 110 can display text or graphics in black and white, greyscale, or color. The system can utilize Bluetooth® Low Energy RF (from 2.4 GHz to 2.483 GHz) wireless technology to provide intermittent, minimized communications, using very low power to transmit and/or receive data with other components of the system 200 including mobile devices or gateway devices. The system 200 can use FHSS wireless communication technology. A software application ("app") for generation of text or images including human and/or machine-readable information utilizes processing in the more capable and less power-constrained device such as mobile device (e.g., smartphone) or web applications resident on high power servers and communication through the mobile device or a gateway. This allows for infrequent use of very low power and low cost processing elements in the eNote display device. In some implementations, the eNote display device can gather data from an on-board accelerometer and present the information on its display or via one or more light sources (e.g., light emitting diodes (LEDs)) or wirelessly communicate the information to the mobile device or gateway. Use of Bluetooth low energy Received Signal Strength Indication (RSSI) and Beacon protocol allow the mobile device or fixed gateway to determine relative distance and/or location (e.g., via triangulation or trilateration techniques). This allows applications to provide location-aware information for the display. These elements combine to allow low cost wireless and long battery life from a display device that that is adaptable to multiple use cases defined entirely by the smart device or web application.

A possible advantage to eNote device is the recognized need to tag people, places and things with information that is both visually and electronically readable. In many cases a mobile device such as a smartphone is not immediately available or desired to get information about a person, place or thing. The eNote device provides immediate visual information in those cases, and allows electronic interaction with the once a device is available. The eNote device can be a low power consumption device, for example, due its use of a low-power-consumption display, its use of intermittent transmission of small data packets (at a lower rate than other communication protocols), etc. Due to the low power consumption, embodiments of eNote devices can be operated from one or two coin cell batteries (which can provide power for one or more years) and can be made to have a small package footprint and be easily portable.

An embodiment of eNote utilizing e-paper technology may be preferable to other technologies including LCD and physical paper for areas of application that require regular, but infrequent changes. This is summarized in the table below.

|  | Update Frequency | Possible Display Technology |
| --- | --- | --- |
| Frequent | many/sec | LCD or eNote |
| Regular | Several times per day, weekly | eNote |
| Rarely | 1/year | eNote or Paper |

Example Usage Scenarios

The eNote display device and eNote system is designed to be adaptable for many markets, and the unique combination of technologies and implementation enable applications and provide for usage in areas not available today to electronic displays. The general elements of eNote can be combined or simplified for specific scenarios. The examples discussed in this disclosure are meant to illustrate the capabilities and uniqueness of eNote and the overall general utility and applicability for multiple use models. These scenarios are neither exhaustive nor exclusive since the unique eNote design allows using the eNote display device and system in any situation requiring tagging people, places or things.

Home Calendar Scenario: In the home, having a digital display that can receive data from many devices and function for months or years on batteries alone enables significant new use cases. In an example home calendar scenario, the eNote accepts and coordinates calendar entries from several family members and displays them on a common format in a location visited regularly by all family members, for example, on the front of a kitchen refrigerator. The eNote display can be adhered to the surface (e.g., via a magnet on the back of the display) or built-into the appliance itself. An eNote app on the family members' smartphones can publish the family members calendars, tasks, etc. for display by the eNote display, so that other family members can view the upcoming calendar entries, tasks, etc. The eNote app can, in some cases, access a family calendar stored on the web (e.g., on a cloud computing platform).

Retail Scenario with ESL tags: Low power allows operation from low cost batteries and makes practical use models that require sealed enclosures and long-life disposable or recyclable tags. These ESL tags can therefore be used in place of paper by food retail markets such as bakeries and meat deli cases. The RF signal is not absorbed by most plastic materials used in the composition of enclosures, and several of those materials are also be compatible with the requirements of those markets (e.g., food grade).

A retail store frequently updates tags with pricing and product information, and some practice changing pricing (e.g., dynamic pricing) depending on demand, customer flow and even time of day. But changing out printed tags frequently is impractical, especially in crowded cases and stores with large numbers of products.

The eNote system can allow for dynamic pricing for the retailer as well as providing the customer with information about the product. Product information can be provided with visual elements, including human-readable (text), machine-readable optical features (e.g., QR codes that can provide a digital ID for the product), or machine-readable beacons or uniform resource locators (URLs). An example ESL tag is shown in FIG. 1B. Multiple eNotes can be used in a single product space (e.g., a display cabinet). In some implementations, an eNote Beacon allows position to be calculated. For example, an app can display a user map showing positions of all the eNotes in a location, so that the eNotes can be selected and programmed.

Figure 3A:
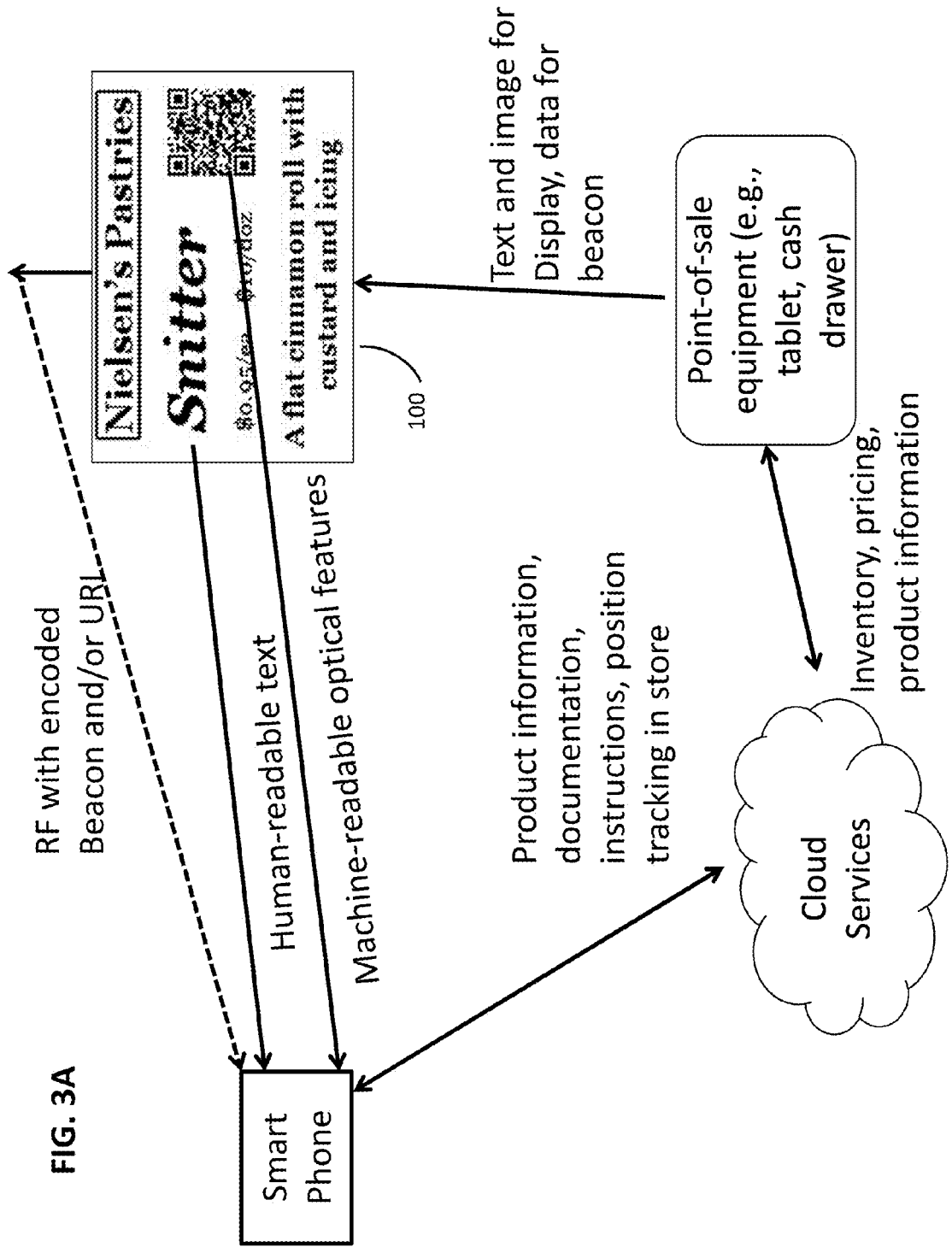
FIG. 3A shows an example retail store price tag scenario using an implementation of the eNote system.

An example retail store price tag scenario is shown in FIG. 3A. With position data, a user can be confident a specific eNote display device is correctly updated with new product information. Cloud services can provide inventory, pricing, and product information to point-of-sale equipment, which can communicate the information to the eNote display device. The eNote display can output human-readable features such as alphanumeric text (e.g., "Snifter") and/or machine-readable optical features (e.g., QR codes, bar codes, etc.). The eNote device can also output information wirelessly via RF (e.g., a beacon or an URL).

Bus Stop/Off-Grid Scenario: The low power consumption of the eNote, combined with the usage of smartphones or gateways to communicate with the Internet allows deployment of devices at low cost for off-the-grid scenarios utilizing energy-harvesting techniques such as solar cells.

Figure 3B:
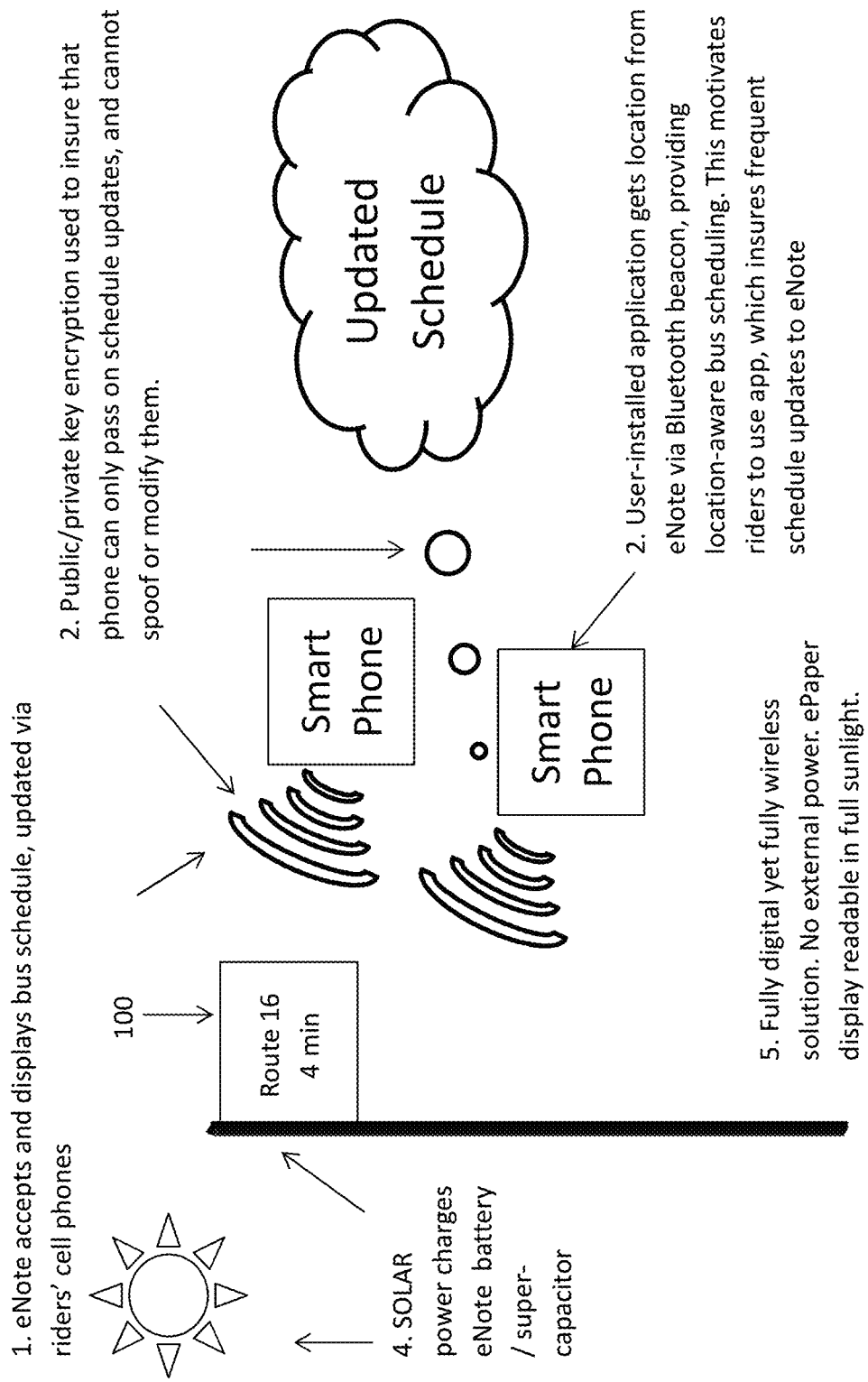
FIG. 3B shows an example bus stop scenario using an implementation of the eNote system.

Public signage often requires installation in situations that are difficult for data and power connectivity. This scenario in FIG. 3B illustrates the capabilities of the eNote device 100 to eliminate both connections to provide visual information for bus riders using energy-harvesting and the customer's phones for gateways to the internet. Although the example is for a bus route, the eNote system can be used for any transportation system (e.g., rail, airline, taxi, subway, etc.). The display of the eNote device 100 shows the bus route number (16) and the time of arrival of the next bus (4 min). Although not shown in FIG. 3B, the eNote display could show both human-readable text as well as electronically readable information embodied in QR codes. For example, a rider's smartphone may be able to scan a QR code output on the eNote display to obtain an updated bus schedule. Information from the cloud to the user's mobile devices can be encrypted to ensure that the mobile device can securely pass on only scheduled updates for display by eNote. The eNote display can include (or be electrically connected to) a solar power source to charge the eNote display (e.g., the display may include a supercapacitor or rechargeable battery).

Parking Lot Scenario: The low power consumption of the eNote device 100, combined with the communication with the a wireless network such as the Internet allows deployment of small devices at low cost for repeated usage such as parking receipts that must be visually inspected, but conventionally must be printed and replaced each time. In this example scenario depicted in FIG. 3C, the eNote replaces the parking receipt and can be reused in any lot supported by the smartphone App. The eNote device 100 can be placed in an automobile (e.g., on the dashboard) in the parking lot and its display can output information on the current time or date, the amount of parking time paid for, the date the parking time was purchased or reserved, identifying indicia (e.g., ticket number, parking lot number, address), and so forth.

The parking lot can also electronically check tags and verify with an online database to reduce potential fraud, because a portable device (e.g., carried by a parking lot attendant) of a fixed gateway device can communicate wirelessly with the eNote devices in the automobiles. Additionally, the customer may be able to update the parking time (e.g., add time) over the Internet via a smartphone app, and the eNote device can be updated by the parking lot attendant's device or fixed gateways deployed throughout the lot. Location information is provided for the customer who may not be able to remember the location of their vehicle. In the case that a customer inadvertently leaves the lot with the eNote device (rather than returning it), a message to return the device can be wirelessly sent to the device 100 for display to the customer.

Figure 3C:
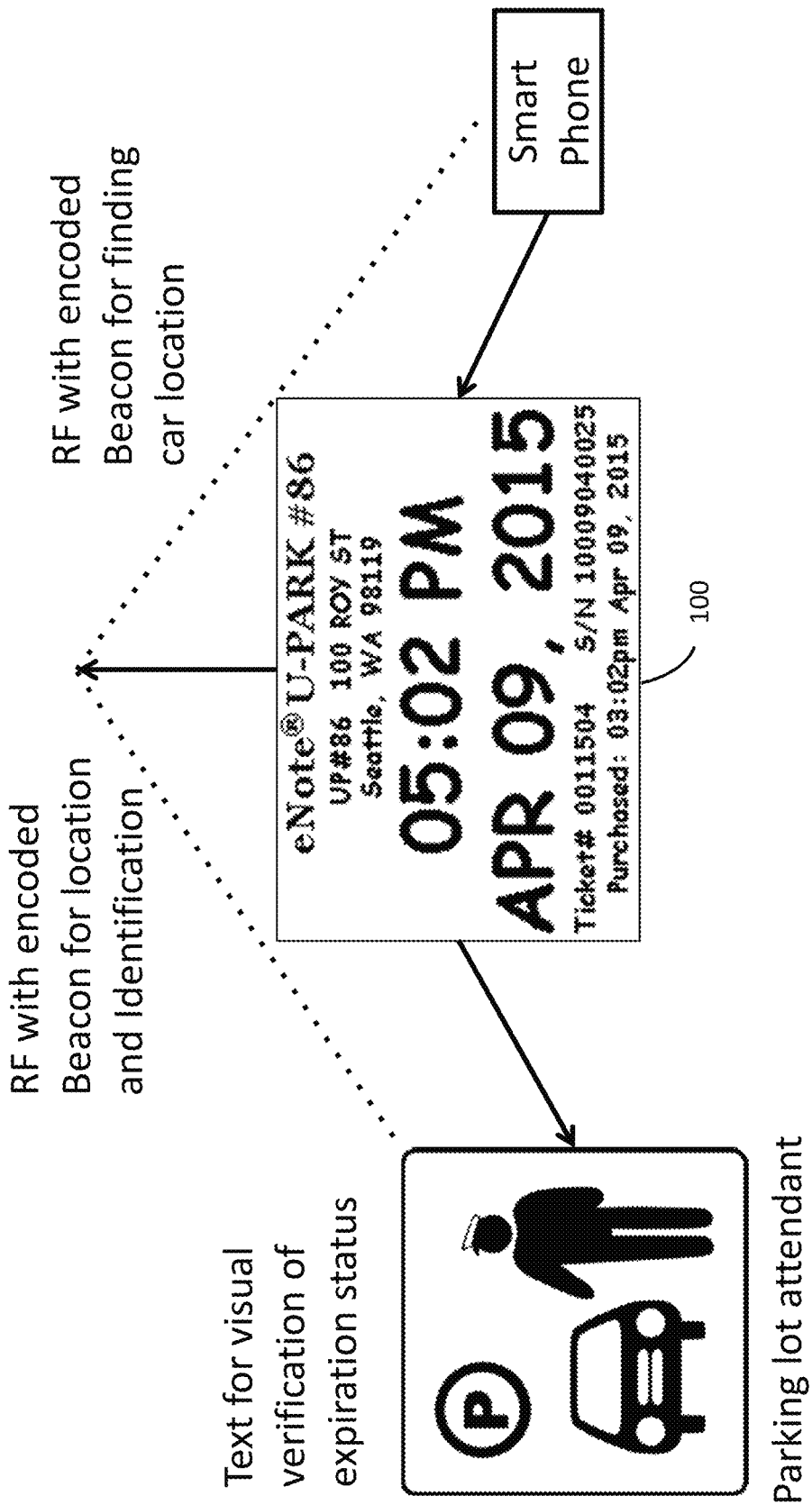
FIG. 3C shows an example parking lot scenario using an implementation of the eNote system.

FIGS. 3D-1 and 3D-2 show examples of user interfaces (UIs) 310a, 310b by which a user can update parking information on the eNote display of FIG. 3C, for example, to pay for additional parking time. The UIs can be output on the user's portable computing device (e.g., smartphone). The example UI 310a shown in FIG. 3D-1 shows the date and time, the name of the user, where the user's car is parked, user payment information (e.g., credit card information), and includes a drop-down box by which to select the amount of time to add. The UI can support user authentication (e.g., touch ID, password, etc.). The UI 310b shown in FIG. 3D-2 shows successful payment for the added time and indicates that an alarm has been set to remind the user when the parking time is up.

Office Room Scenario: Wireless updatability and multi-year battery capability allow existing spaces to use the eNote displays, without wiring or re-wiring. Examples include conference room schedule displays utilizing either a mobile or fixed gateway to update information. For example, the eNote display device can be affixed adjacent a door to a room and can show the room assignment schedule for a business, school, office, etc. The eNote application can run in a central location (e.g., on a computer at a receptionist's desk) to provide updates to the eNote as room schedules change. The eNote display device can wirelessly broadcast its position (e.g., the position of the room) for receipt by eNote apps in the vicinity (see, e.g., map UI in FIG. 3E).

The eNote proximity and location features also allow workers and visitors to more easily find conference and office rooms in a larger and confusing facility (e.g., via accessing a map on a mobile device showing room locations). The eNote display device can assure privacy by changing the display to indicate "Occupied" or "In a meeting" or "Please do not disturb" when a meeting in the room is taking place.

Figure 3E:
FIG. 3E shows an example UI in the form of an office map to assist a user to navigate to a particular office whose location is broadcast by an eNote display device located adjacent the office.

FIG. 3E shows an example UI 320 in the form of an office map to assist a user to navigate to a particular office whose location is broadcast by an eNote display device located adjacent to the office. The UI can be displayed on a user's mobile device. The map shows the layout of the offices (with office numbers) in a portion of an office building near the location of the user's mobile device. The position of the user can be indicated by an icon 325a whose position moves on the map as the user navigates to the desired office (e.g., Jaime Seafarer in Office 234) shown by an office icon 325b. In other scenarios, the UI 320 can be displayed on an eNote device carried by the user.

Meeting Scenario: Wireless updatability and the ability of the eNote display device to broadcast or advertise a unique identifier provide functionality for visual identification as well as electronic information transfer at conferences or meetings. In various embodiments of the eNote device, the advertising may be undirected and/or non-connectable (e.g., the eNote will not support a data connection but only broadcast information). In other embodiments, the eNote device may operate as a connectable device that can accept (or initiate) connections from other wireless devices. For example, an eNote display device can be worn by participants at a meeting or conference as a name badge and may show the participant's name, organization, a machine-readable code that encodes such information, etc.

The eNote proximity and location features also allow mobile devices of participant's to exchange information using either information from the cloud located using their unique electronic identification, or utilizing information embedded in an optically readable tag in the display such as a QR code (which can be scanned by another participant's mobile device).

The foregoing scenarios are merely examples and are not intended to limit the scope of the uses or applications for the eNote technology.

Example eNote Display Device Configurations

Electronic displays are useful components in computer and machine computation, control and interaction and allow the human to interact with the machine. Display technology that allows computing equipment to translate information from digital form into optical images that are human readable has developed to the current state of the art that allows eNote implementations of small rechargeable devices to display rich text and graphical information.

This disclosure details examples of a system whereby an advanced low-powered display can be combined with a wireless interface that allows transmission of the data necessary to create the image on the display. Additionally, the wireless technology facilitates location and identification of that display using both human-readable features as well as one or more machine-readable features (e.g., displayable optical features or broadcast beacons). The machine-readable features can include, but are not limited to, optical and radio-frequency (RF) technologies for broadcasting or transmitting information. Note that this system is not limited to mobile devices such as smartphones, but can include any device including computational elements, wireless elements and optional optical elements capable of acquiring and interpreting the information on the display as well as those capable of transferring image information to the display.

Other implementations of the system may utilize fixed gateway devices in place of or in addition to mobile devices. The gateway device allows transfer utilizing wireless communication to the eNote display device and either wireless or wired means to connect to local or wide area networks and facilitate connection to the internet.

Embodiments of the eNote wireless electronic display can utilize Bluetooth low energy (BTLE) wireless technology as defined, for example, in the Bluetooth specification 4.0, and subsequent revisions of the technology specification including similar elements and descriptions. It is understood that the present state of the art makes Bluetooth an appropriate choice, but any technology supported by mobile and fixed computing devices may be considered if it implements the functionality provided by BTLE in the present or future.

BTLE is a radio-frequency transmission technology utilizing frequency bandwidth in the Industrial Scientific and Medical (ISM) UHF band at a frequency range of 2.4 GHz-2.483 GHz. It is designed to provide low power, limited data rate connectivity for data transfer particularly between battery powered and mobile devices.

Figure 4:
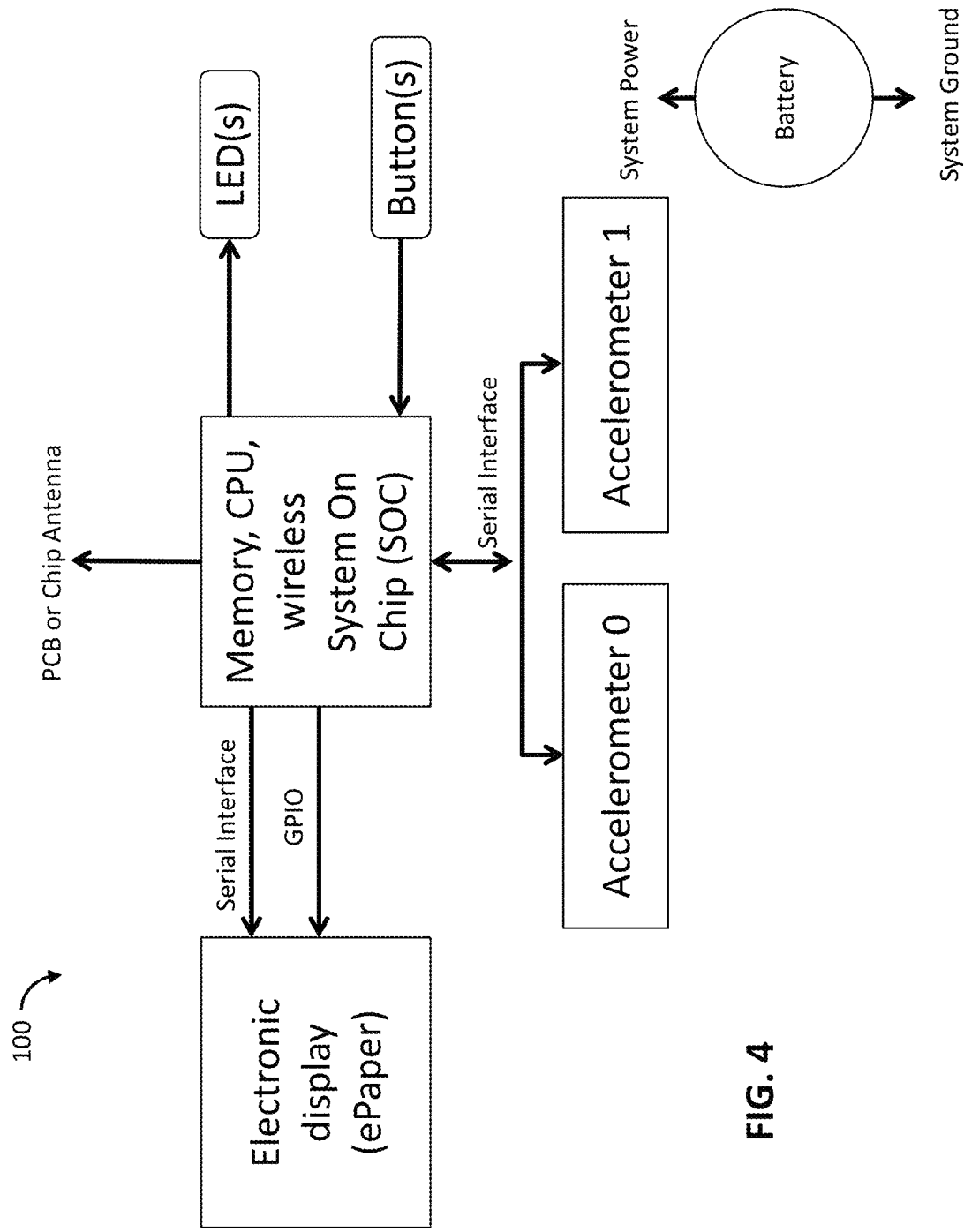
FIG. 4 is a hardware block diagram that schematically illustrates an example hardware configuration of a an eNote display device.

FIG. 4 is a hardware block diagram that schematically illustrates an example configuration of an eNote display device 100. In this embodiment, the eNote device 100 includes a System On a Chip (SOC) integrated circuit that contains, but is not limited to computing elements (CPU), memory (including both volatile and non-volatile types such as RAM and FLASH) and wireless interface circuitry. The SOC can include circuitry used to implement a BTLE interface including both digital and RF circuitry. The SOC also drives an antenna used to match the RF impedance to free air; this antenna is shown in FIG. 4 as either a circuit board trace element or as a monolithic chip antenna, but the device can utilize other technologies including external wire and whip antennas. The SOC also may include circuitry used to transfer information and control the electronic display 110, external components such as one or more accelerometers, and additional human interface components such as Light Emitting Diodes (LEDs) and push-button switches for user input or resetting the system.

Several types and technologies of display could be utilized for the device 100, such as thin film transistor (TFT) LCD and various implementations of electronic ink technology. The display may comprise a reflective display that has bistable elements that use little or no electrical power except when the display is changed or updated. One possible choice for a low power display is provided by e-paper technologies such as that implemented by Pervasive Displays, Inc. (Taiwan, R.O.C.). These displays use small amounts of power to change the image and zero power to hold that image for very long periods of time (even years) since they utilize a method that creates a physical state change for elements of the image.

The combination of the very low power communication technology provided by BTLE and the low power required to change (and no power to hold) images provided by, for example, e-paper or e-ink technology, allow the eNote to operate from coin-type primary lithium batteries shown in the diagram. Note that although lithium coin cells have been selected for the illustrated implementation due to their low cost, small size, flat shape and high power density, other power sources available today and in the future may be utilized according to cost, power, size, shape and use model considerations. For example, supercapacitor(s) can be used in addition to or as an alternative to rechargeable or replaceable batteries.

The implementation of the display device 100 shown in FIG. 4 includes one or more components or elements to sense position and movement such as one or more accelerometers. These may be implemented as shown as individual components or potentially integrated into future SOC designs. The use of one or more of these accelerometers allows for several features to be provided by the eNote.

Movement can be detected and characterized by the circuitry in accelerometers allowing the detection of the eNote being moved so that it can alert devices that its location has changed since it last advertised or connected to the mobile device. One embodiment utilizes low power, very small, 3-axis devices supplied by the STMicroelectronics LIS3DH device (available from STMicroelectronics, Aliso Viejo, Calif.). It is understood that other motion sensors providing movement or positional functionality could be utilized additionally or alternatively to accelerometer(s) and include other devices such as magnetometers, gravitometers, gyroscopes, etc.

Additionally, the accelerometer(s) can provide data when the eNote device 100 has been touched or tapped by a user (e.g., with a finger) or with a stylus. This information can be to alert a connected device and relate user input including, but not limited to: simple responses (yes/no) and selections relating to the text or graphical elements on the display. Analysis of the accelerometer data can also be used to relate positional information from the display interaction (e.g., a tap). Two or more accelerometers such as shown in the illustrated embodiment in FIG. 4 provide information to determine the location of the tap by using triangulation or trilateration methods of the waveforms and timing information provided by the accelerometer data.

Certain implementations of the eNote device also may include at least one Light Emitting Diode (LED) to indicate various states of the device including, but not limited to, connection status, power levels, and user feedback. Additionally, by rapidly turning the LED on and off in an encoded sequence, it can be used as another method to transmit machine-readable information such as is used by remote control devices using infrared data association (IrDA) methods. It is understood that alternative display techniques such as color elements integral in the display itself as well as alternate low power display technologies (or color ePaper) may also be utilized to display these kinds of information.

The eNote device can also include one or more switches (e.g., push button switches). These elements allow additional user input to the device including, but not limited to, reset and altering the state of the eNote to allow connection activity from a mobile device.

Example Human and Machine-Readable Elements

Figure 5:
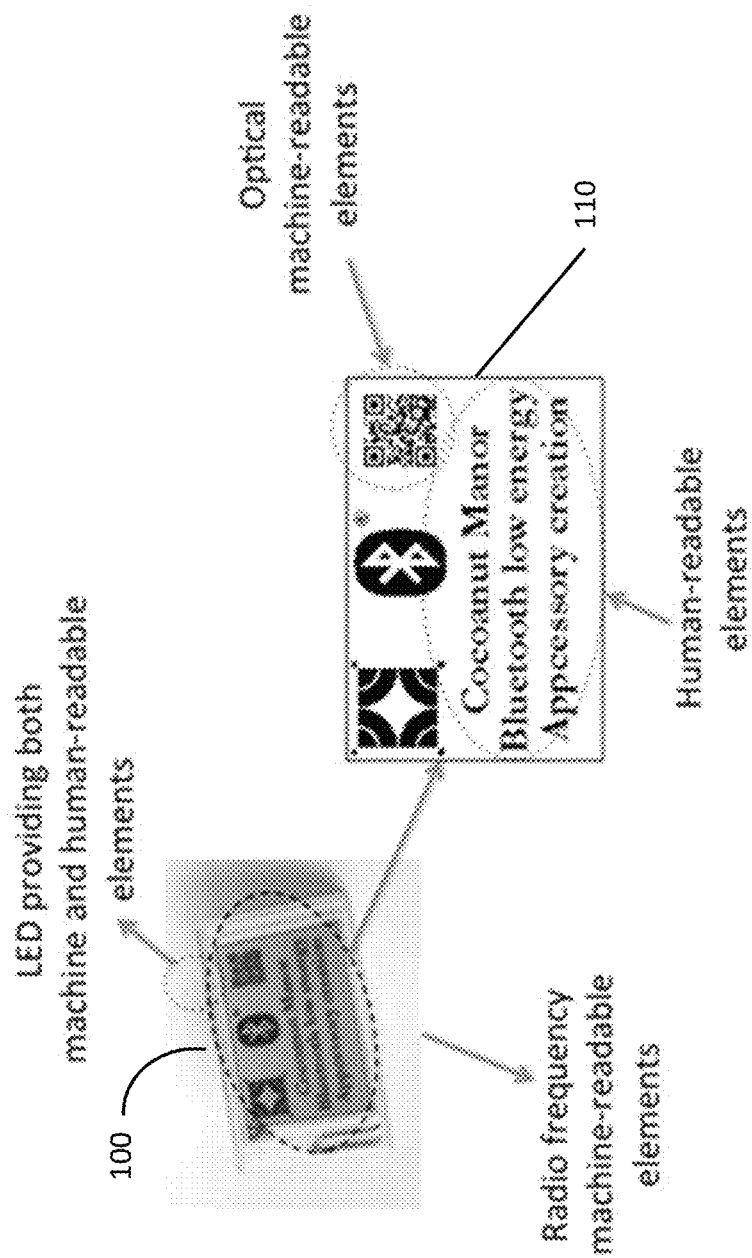
FIG. 5 schematically illustrates an example of human and machine-readable elements of an embodiment of an eNote display device.

Implementations of the eNote device can provide a unique combination of both human and machine-readable elements. FIG. 5 schematically illustrates an example of human and machine-readable elements shown on the display 110 of an eNote display device 100. The display element used in the eNote can present a high-contrast visual image that is easily viewed in a wide variety of lighting situations including daylight, office light, etc. For example, the display of the eNote device can include a reflective display that is visible when external lighting (e.g., daylight, office light) is sufficiently bright. The display can contain, but is not limited to, human-readable text information in one or more languages. This text can include, but is not limited to, words or numbers that indicate contents of a package, a room or any other description such as price, name or description. The information can be used to identify or "tag" any person, place or thing.

Additionally, the display may contain portions of graphical images including visual machine-readable optical elements such as barcodes or QR codes. These can provide information, for example, to a smartphone utilizing its built-in camera and processing elements and do not require application-specific software (apps), but utilize commonly available formats allowing application software that support a broad variety of applications. This machine-readable information may be a duplicate of the textual information or can provide additional or different information. The additional information can include, but is not limited to, a Uniform Resource Locator (URL) or web address and other information directing resources to the Internet or 'cloud'. The machine-readable information could also include data that automatically initiates activity in the mobile device including, but not limited to, initiation of activities such as starting applications.

Another machine-readable element embodied by the eNote implementation utilizes a light source (e.g., an LED) that is modulated (e.g., to turn on and off) in a prescribed way (transmission protocol) that can be used to provide the information described for the machine-readable elements above. A device with an optical sensor or reader can receive the modulated optical signal from the eNote device. In some implementations, an eNote device can include the optical sensor or reader.

Additional machine-readable information includes the location or proximity information provided by a BTLE proximity service. This information can be used to provide location information to differentiate between different devices including other eNote devices in the vicinity. This type of machine-readable information (or others) can be communicated via RF to nearby device.

Embodiments of the eNote device 100 also can include non-volatile memory that can be made accessible to the user application on a mobile or gateway device utilizing BTLE. This memory can be used as electronic notes or scratchpad, much like a re-writable piece of paper. This may be used in situations where the eNote acts as a scratchpad such that notes, which can be annotated with time, date and have specific access privileges. Other uses for this scratchpad can include storing encryption keys that might be used to allow access to the eNote or a subset of its features including the scratchpad memory itself. The display 110 of the eNote device 100 can output images (e.g., text or graphics) associated with information stored in the scratchpad memory.

Figure 6:
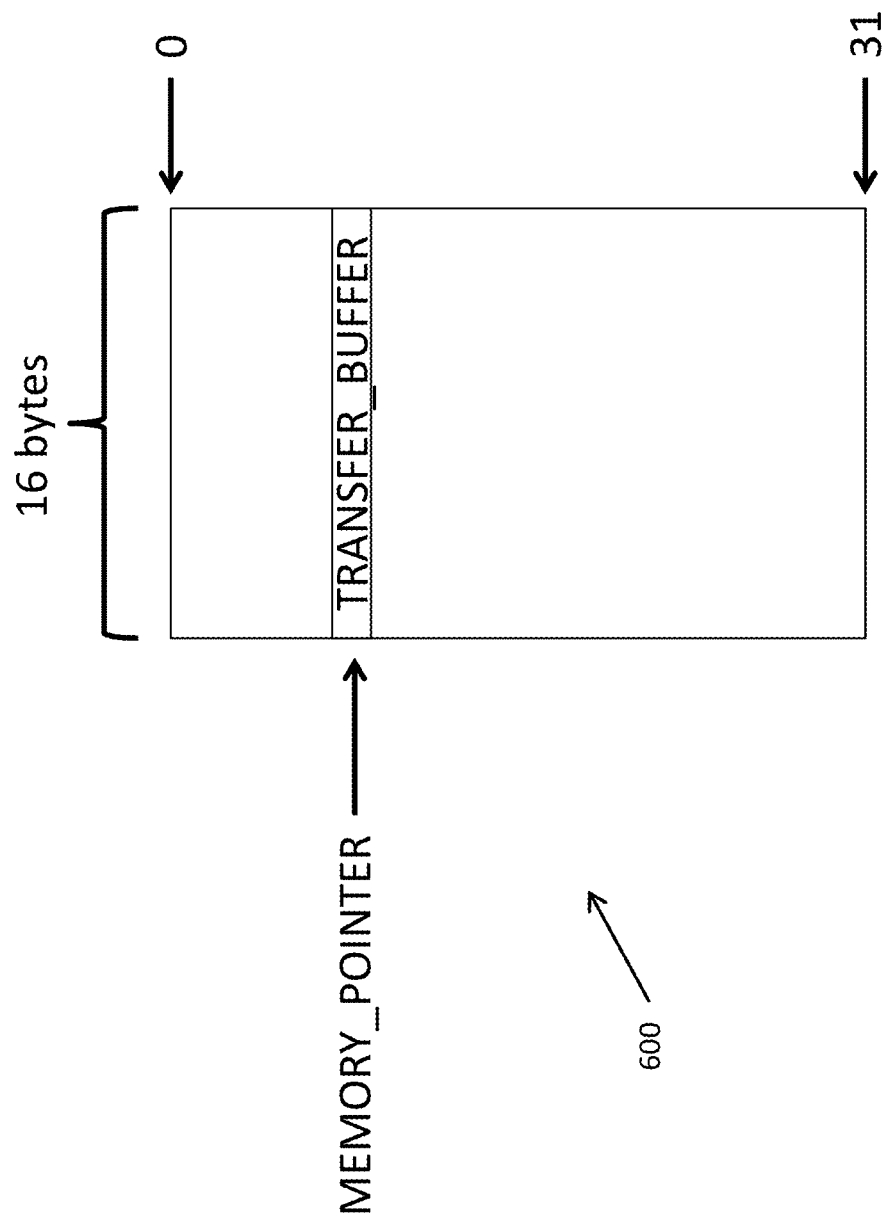
FIG. 6 is an example of a scratchpad memory for an embodiment of an eNote device.

FIG. 6 is an example of a non-volatile scratchpad memory 600 for an eNote device 100. In this example, a set of characteristics allow read/write access using the following mechanisms, outlined for a 32 frame memory (a frame=16 bytes).

| Characteristic | Attributes | Length | valid values |
|---|---|---|---|
| MEMORY_POINTER | read/write | 1 byte | 0 . . . 31 |
| TRANSFER_BUFFER | read/write | 16 bytes | 0x00000000000000000 . . . 0xFFFFFFFFFFFFFFFF |

Another aspect of BTLE technology and specification is the capability to transmit data without connecting devices during what is termed non-connected advertising. A BTLE device advertises data that can describe the capabilities of that device (device and service description) and can include manufacturer specific data elements. One such definition of these data elements may be formatted to include a unique ID number (UUID), and two or more additional data elements that provide unique address information (called major and minor address). Additional data transmitted during advertising according to the BTLE standard quantifies the strength of the signal normally transmitted by the device performing the advertising operation.

The advertising data may also be utilized to transmit data formatted as text to include information such as a Universal Resource Identifier (URI) such as a Universal Resource Locator (URL) that is commonly used as internet addresses for web sites and services. A relatively standardized approach is detailed in the Google Physical-Web project and can be used in some eNote implementations.

A receiving device, such as the a mobile device or a gateway, includes RF electronic components that interpret the RF information from devices such as the eNote utilizing BTLE and gives the data to the processing elements in the mobile device or gateway. The RF components also can measure the strength of the signal received, the Received Signal Strength Indication (RSSI). Computation elements in the receiving mobile device or gateway can utilize this information and provide them to application software.

RF signal strength is reduced with distance according to the inverse square law represented by the formula $1/X^2$, where X is the distance between the two devices. By utilizing the knowledge of the physical interaction above, and information of the RSSI and the transmitted signal strength from the device, the computation elements in the mobile device or gateway can estimate the approximate distance between the mobile device or gateway and devices such as the eNote.

Embodiments of the eNote device can configured with beacons or iBeacons (available from Apple, Inc., Cupertino, Calif.) that can be used for proximity detection in some eNote system implementations. An eNote device can be configured to transmit undirected advertising events (connectable or nonconnectable) to devices that may be scanning for the presence of such events. An eNote device can be configured to scan for advertising events (connectable or nonconnectable) from other devices. For example, a beacon can use Bluetooth low energy proximity sensing to transmit a universally unique identifier to be picked up by a compatible app or operating system (e.g., on a nearby smartphone). The identifier can then be looked up over the Internet (e.g., by the smartphone) to determine the eNote device's physical location or trigger an action on the device such as a check-in on social media or a push notification. Embodiments of the eNote device can utilize these techniques to provide the functionality described above in addition with the display information to provide a unique device applicable to many situational requirements.

Example Hardware Implementation of an eNote Display Device

Figure 7:
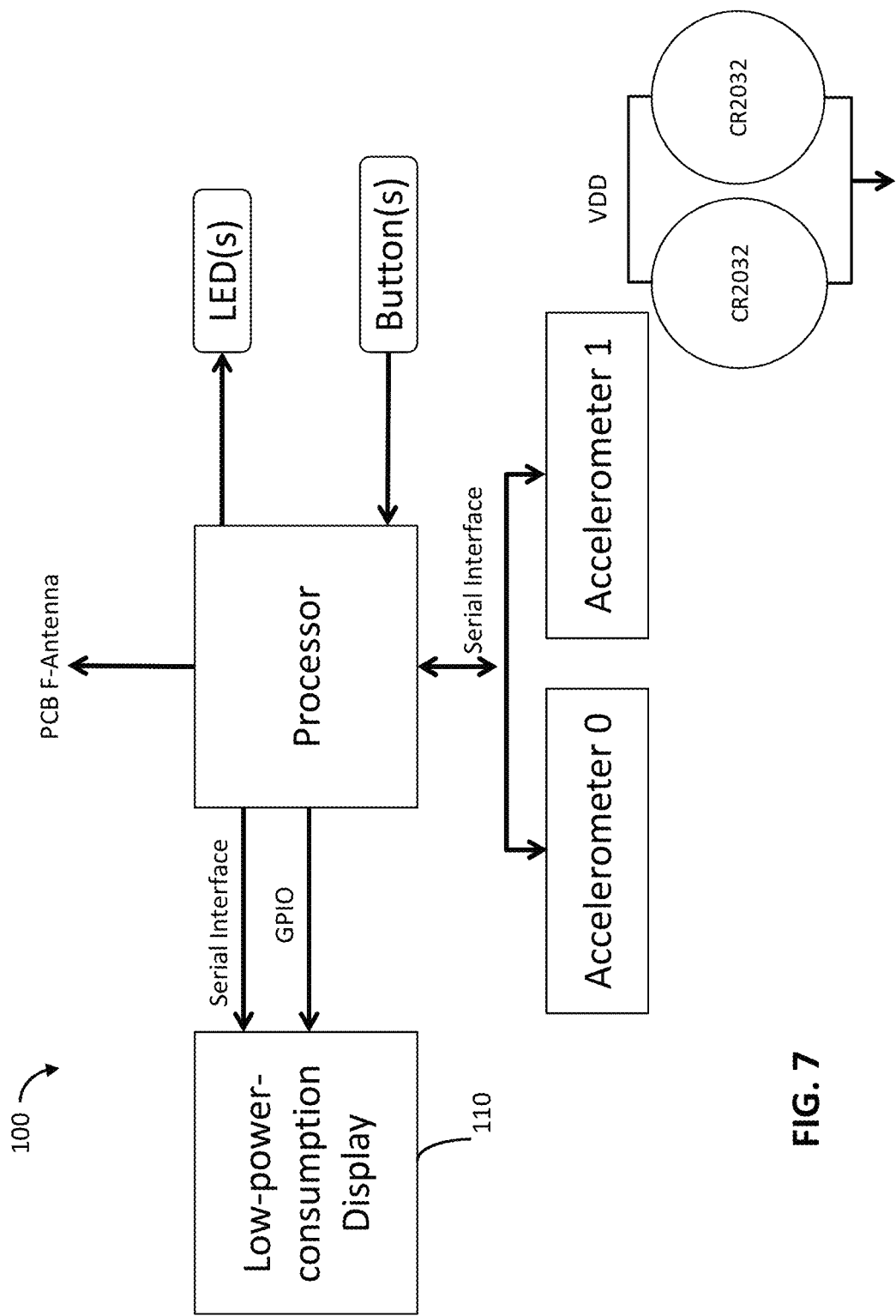
FIG. 7 is a block diagram of an example hardware implementation of an eNote display device.

FIG. 7 is a hardware block diagram of an example hardware implementation of an eNote display device 100. The embodiments described herein include software components that provide many of the functional elements. The display 110 can be a low-power-consumption eInk display (2.7 inch, available from Pervasive Displays Inc., Wilsonville, Oreg.). Those elements providing location or beacon operation are described in the Bluetooth low energy specifications, as well as documentation and examples provided by the illustrated processor, which in this example is an nRF51822 ARM CPU available from Nordic Semiconductor (Oslo, Norway). Additionally, the illustrated embodiment of the eNote provides BTLE software (stack) that implements details of BTLE software components and interfaces utilizing the Nordic nRF51822 SOC processor. The power source can include one, two, three, or more batteries including lithium cell batteries such as CR2032 batteries. In other implementations, the power source can include supercapacitors or ultracapacitors. The antenna can include a 2.4 GHz inverted F antenna or other microstrip antenna or patch antenna, which may be bonded to the PCB.

A unique implementation is provided by the illustrated embodiment of the eNote display device 100 that allows devices such as mobile devices and fixed gateway devices to communicate with the eNote device 100. This implementation is described as a group of services that provide particular functions. A grouping like this is called a profile in the descriptions used by BTLE. The profile for the eNote includes standardized BTLE services including at least, but not limited to GAP (Generic Attribute Profile) used to advertise or describe the device to other BTLE devices), or GATT (Generic ATTribute service) used to transfer data in a standard fashion. These services may be implemented in the software contained in, and executed by, the SOC element and its associated software stack.

BTLE devices can operate in one, or a combination of, two modes: Peripheral or Central. The Central mode is the Master, providing instructions and coordination of data. When an eNote device is in the Central mode, the eNote device can wirelessly scan for the presence of another device (which can advertise its presence) and initiate a connection to the other device (which acts as a slave and is in Peripheral mode to the eNote device). The eNote can communicate bidirectionally with the other device after the connection is established. The Peripheral is a slave, responding to the commands from Central as well as performing advertising for connections (and Beacon). In some implementations, the eNote functions in Peripheral mode. This is not a limitation of the hardware or software, and an implementation of the Central mode instead of, or in addition to the Peripheral mode of operation is envisioned for other scenarios.

For example, as described further below, some embodiments of the eNote device can operate in both Central and Peripheral mode, e.g., substantially concurrently via multiplexing (time division or frequency division). For example, the eNote can advertise it presence to nearby mobile devices or gateways, which would act like masters to the eNote device (which operates in Peripheral mode). The eNote can also scan for the presence of nearby devices that are advertising their presence and initiate a connection to the advertising device (which is a slave to the eNote device acting as a master). When in the Peripheral mode, the eNote device can accept an incoming connection request (after advertising) from the nearby device (e.g., a smartphone). The eNote device (which acts as a slave) and the nearby device (which acts as the master) can communicate bidirectionally once the connection is established. In either Central or Peripheral mode, the eNote display can output information received from the other device. For example, as discussed further herein, one or more portions of the eNote display can output information received from the other devices. The eNote device may process the received information prior to displaying it. As an example, an eNote device may be in Central mode to connect to a sensor device (which may be in Peripheral mode) so as to receive a data stream from the sensor device for processing, display, or communication to another device. The eNote device may also be in Peripheral mode (e.g., during a different time slice than when it is in Central mode) so as to receive or transmit a data stream to another device (e.g., a smartphone or gateway) that is in Central mode. Thus, the eNote device can, for example, receive and display data from the sensor device and data from the smartphone or gateway.

BTLE Peripherals implement one or more Profiles in addition to GAP and GATT. A Profile is a collection of one or more Services. A Service is a collection of one or more Characteristics that are a collection of one or more bytes of data. These Characteristics have Attributes that describe the permissible operations, such as read, write, and notify and may be implemented by eNote in certain embodiments.

The eNote software also can include a unique service to allow transfer of data to the display element and interaction with its other unique elements including a push button and an LED. For example, in some implementations, the eNote system can provide Bluetooth Smart Peripheral mode with one or more of the following services: GAP, GATT, battery service, device ID service, or an eNote custom service. For example, one eNote custom service is a custom service: UUID: 0xBBC21523-008E-FE6B-28EE-D6A44F9CB5 DA, with the following custom service characteristics:

| | | |
|---|---|---|
| 0xBBC21524 button | read/notify | 1 byte |
| 0xBBC21525 LED | read/write | 1 byte |
| 0xBBC21526 display block number | read/write | 2 byte |
| 0xBBC21527 display block data | read/write | 16 bytes |
| 0xBBC21528 command | read/write | 1 byte |
| 0xBBC21529 status | read/notify | 16 byte |

The eNote custom service can include device and accelerometer positional status. In some cases, the eNote device may implement basic rate/enhanced data rate (BR/EDR) support. While the Profile and services shown above are implemented in the illustrated embodiment of the eNote device, it is understood that the implementation is not limited to these particular choices and that there are alternative configurations and groupings of the bytes, characteristic ID's and services that can provide the required functionality.

Example Operation and Display Structure of an eNote Device

Application software on the mobile device or fixed gateway (or web application through the gateway) interact with the user as appropriate for the usage scenario to generate the display image and transfer the image to the eNote device for display. Note that for some applications, only partial display updates (e.g., a portion of the text or image) may be utilized, which may conserve power and bandwidth. Although the description below describes the operation of updates to the entire display, a generalization of the structure and the technique presented here allow for that partial display operation.

Figure 8A:
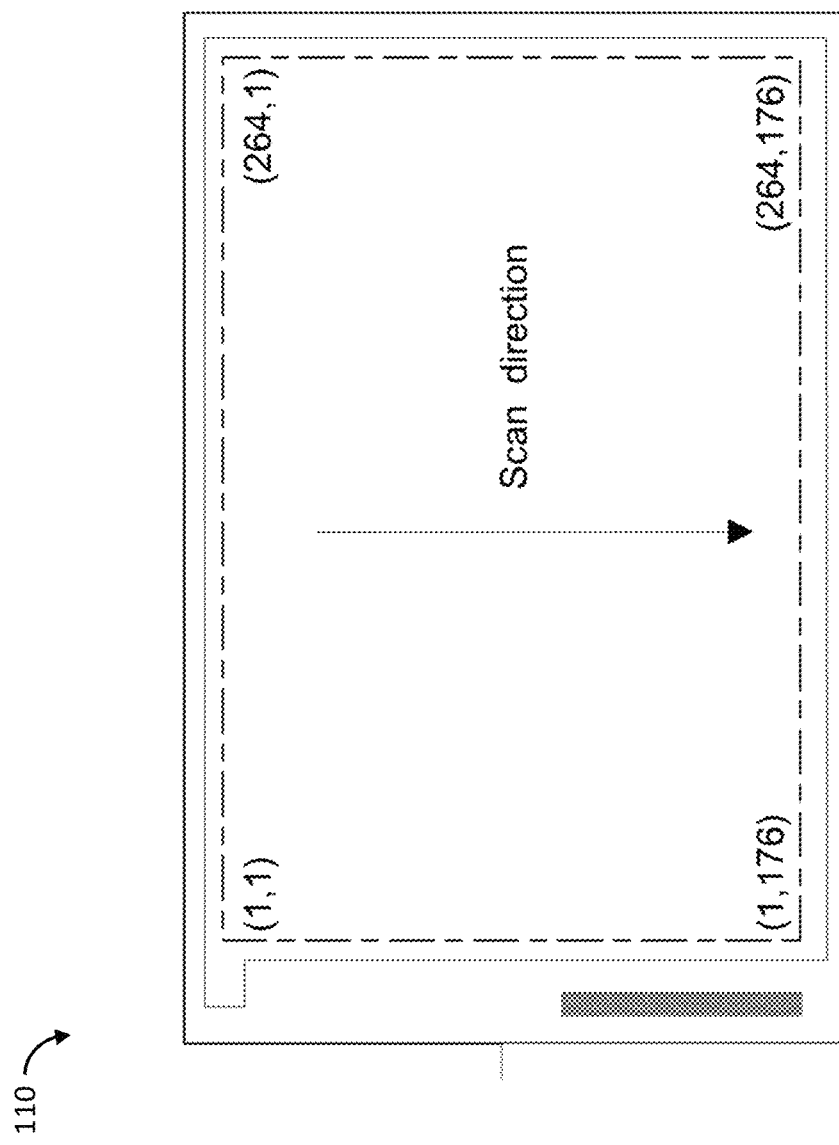
FIG. 8A schematically illustrates an embodiment of a display for an embodiment of an eNote device.

FIG. 8A schematically illustrates an embodiment of a display 110 for an embodiment of an eNote device 100. The illustrated embodiment of the eNote display 110 has 264× 176 pixels, and each pixel is represented by 2 binary digits or bits, including black (11) and white (00). Other combinations of pixels (e.g., 01 and 10) allow for other display features such as another color including, e.g., red. The pixels are packed 8 bits per byte in order from upper left to lower right as shown in FIG. 8A. This results in a data structure of 5808 bytes that are transferred from the Central to the eNote Peripheral as generated by the Application program. The eNote Bluetooth characteristics can be organized to transfer the 5808 bytes of image data in 16 byte blocks. The characteristics allow setting, reading and writing the display buffer. The 5808 byte display buffer can be stored in FLASH memory, and the 16 byte display block can be read/written to the FLASH memory. There are 363 blocks in the buffer for the initial display type described herein.

Figure 8B:
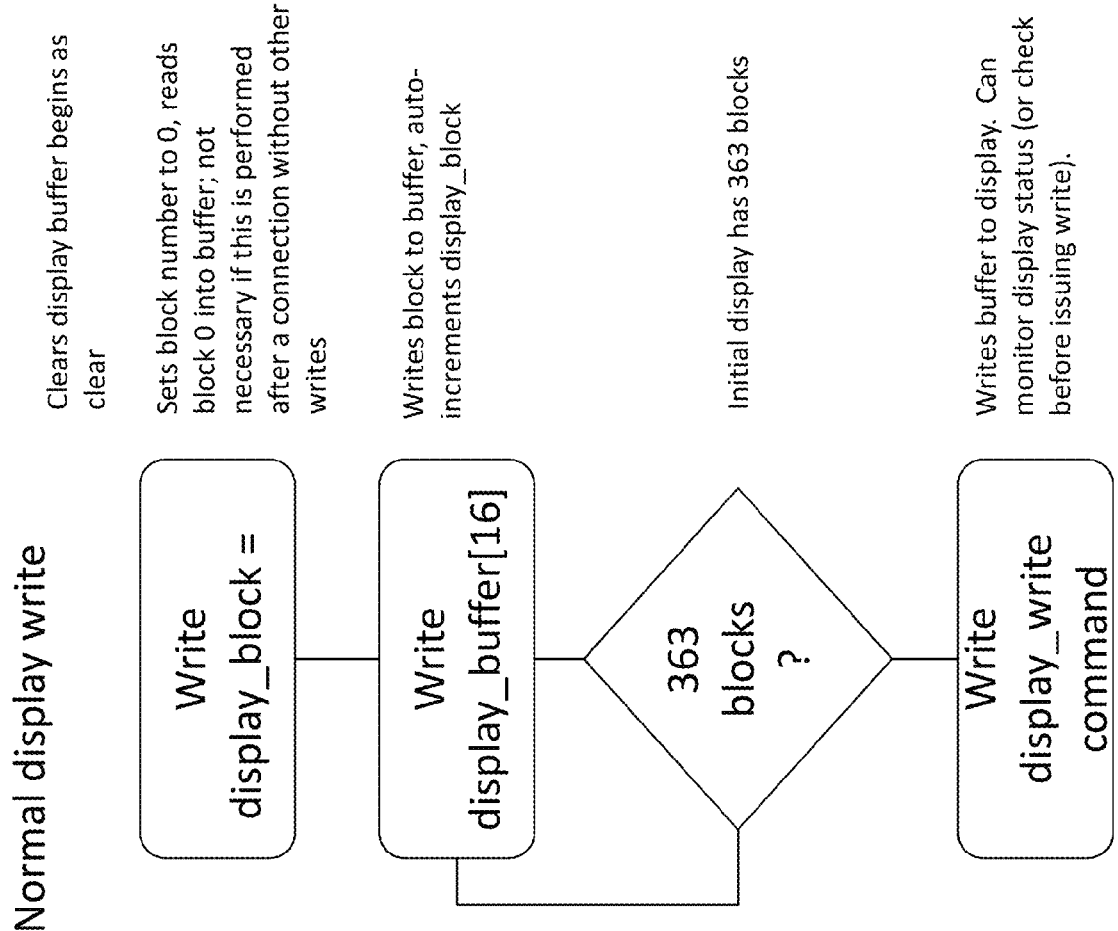
FIGS. 8B-8D are flowcharts that schematically illustrate display operations for an embodiment of an eNote device.
Figure 8C:
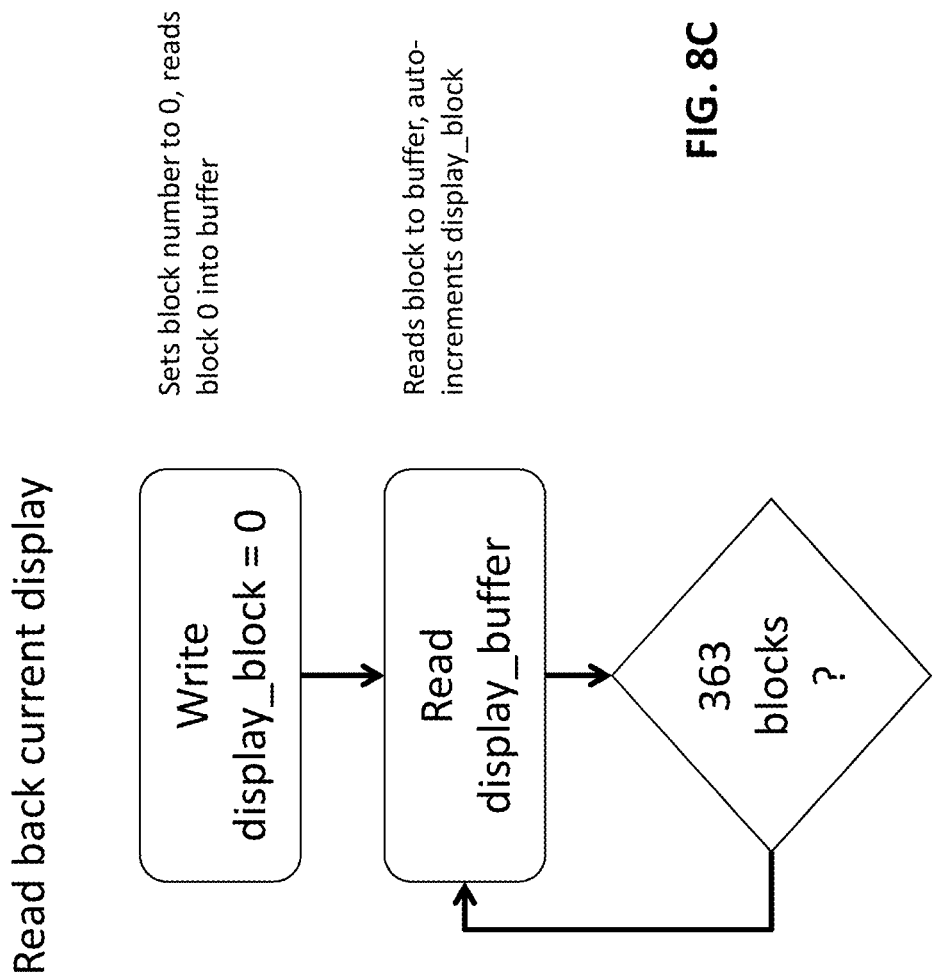
Figure 8D:
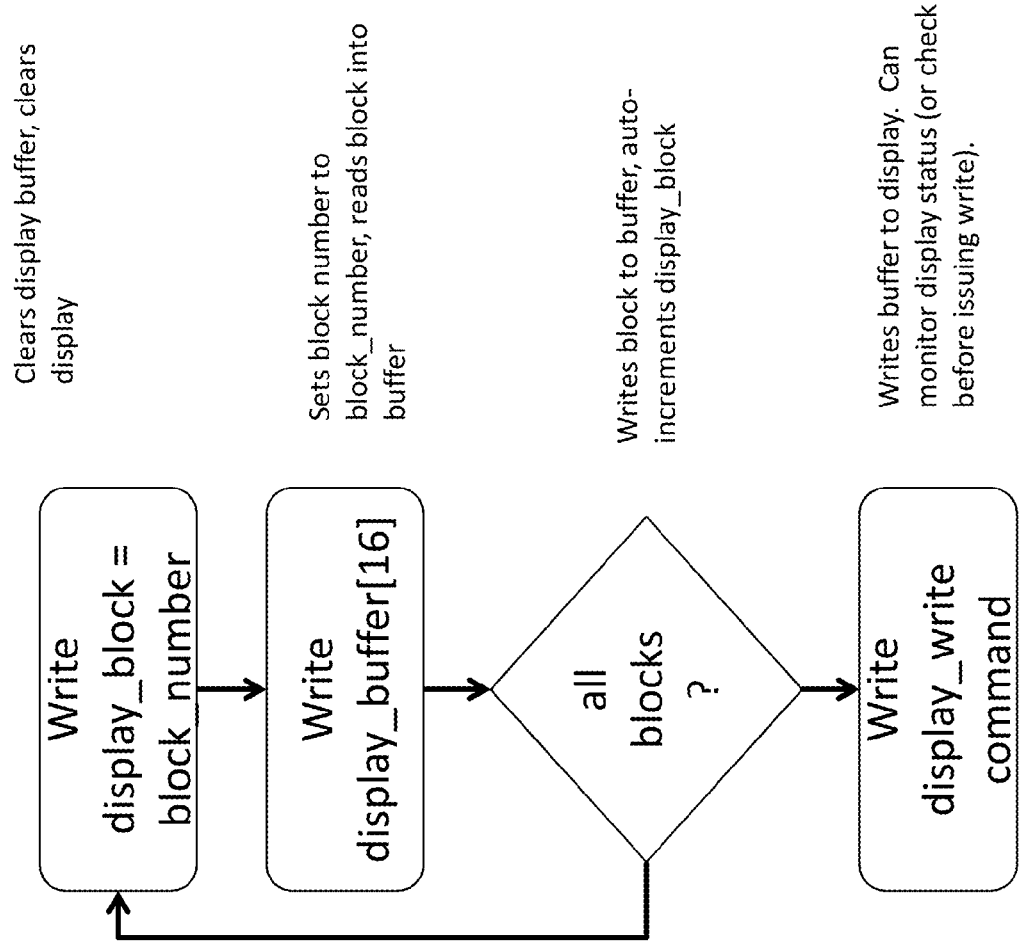

FIGS. 8B-8D are flowcharts that schematically illustrate operating methods for an embodiment of a display of an eNote device. These methods can be implemented in hardware or software in the eNote device. In these examples, the eNote service exposes six characteristics, described below.

Button: The button characteristic is a read/notify element that shows the current state of the push button. The push button toggles the characteristic value from 0x00 to 0x01 every time the button is pressed.

LED: The LED characteristic is a read/write element that changes the state of the LED. Writing 0xFF sets the LED to ON. Writing any other value will set the LED to OFF.

Block number: The block number characteristic is a read/write element that is the index of the current block in the 5808 byte display buffer.

Block data: The block data characteristic is a read/write element that is the data for transfer to/from the 5808 byte display buffer.

Command: The command characteristic is a read/write element that provides commands to the eNote to manage the display itself. Commands can include one or more of: clear display—clears the display and display buffer (to white); write display buffer—sends the current display buffer to the physical display; read status—gives the current display status indicating ready/busy and display type; and test—writes a test pattern to the buffer and out to the display. Status—the status characteristic is a read/notify element that provides information about the eNote device including one or more of: software revisions for the embedded software and BTLE stack, hardware revision, transfer buffer status (e.g., full, how full, empty), accelerometer status, accelerometer data values.

Writing the display block: in the example flowchart in FIG. 8B, the display block is 16 bytes of data representing 16*8=128 pixels. Writing the display block characteristic transfers the bytes into the block, writes that block to the display buffer and auto-increments the display block number.

Reading the display block: in the example flowchart in FIG. 8C, setting the block number automatically reads that block from the display buffer. It does not auto-increment, in this implementation, so as to allow read/modify/write more efficiently (at the expense of a read-out of the display buffer in its entirety).

Clearing the display image: in the example flowchart in FIG. 8D, sending a clear display command will clear the display, the display buffer, the block number and the block contents.

Writing the buffer to display image: in the example flowchart in FIG. 8D, sending a write display command will write the display buffer to the display, set the block number to 0 and set the block data to the data at block 0 of the display buffer.

Concurrent Central/Peripheral Operation

Embodiments of the eNote device can operate in one of several roles supported by, for example, the Bluetooth 4.0 specification, based on the embedded software in the particular embodiment of the device. The main roles or modes are Central or Peripheral, where when the eNote device operates in Central, the eNote device establishes the network and establishes and maintains connections to each Peripheral device (often another device such as a sensor). In this relationship, the eNote operating in Central can be considered the Master on the network and the Peripheral device the Slave.

The eNote device can also be provided with embedded software (stored in a memory) to support multiple Peripheral connections to multiple slaves concurrently. This can be accomplished using a time-domain multiplexing scheme allowing the eNote device to operate multiple state machines and switch context between them using well-understood wireless networking techniques and multi-tasking operating software. These techniques can rely on timing 'spaces' and longer latency connections while servicing multiple connections.

The eNote device can also include operating software (stored in a memory) that would support substantially concurrent Peripheral and Central roles and support multiple connections to multiple devices (master devices or slave devices). This also may be accomplished using a time-domain multiplexing scheme allowing the eNote device to operate multiple state machines and switch context between them using well-understood wireless networking techniques and multi-tasking operating software. These techniques would rely on timing 'spaces' and longer latency connections while servicing multiple connections.

The capabilities described above are allowed under the Bluetooth 4.2 specification and can be accomplished with the hardware design described in various illustrated embodiments, and it is also understandable that other wireless technologies could support equivalent techniques and protocols.

These features enable new use models for embodiments of the eNote device since the device can function in the Central role in order to control peripheral devices (e.g., sensor(s)) and/or display status information received from the peripheral devices, while at the same time functioning in the Peripheral role for another device such as a smartphone or fixed gateway device, which operates as the master. For example, a first portion of the eNote display may show status information received from the peripheral devices (e.g., sensor(s)) and a second portion of the eNote display may show information received from the master devices (e.g., smartphone or gateway). The first and second portions of the display may, but need not be, spatially separate areas of the display. For example, some of the data received from the sensor and some of the information received from the smartphone or gateway may be displayed in adjacent areas, contiguous areas, overlapping areas of the eNote display. In some implementations, the eNote device may process the information received from some or all of the masters and/or slaves and display (or transmit) the processed information (in addition to or as an alternative to displaying/transmitting the raw data streams received from other devices, whether master or slave).

Figure 9A:
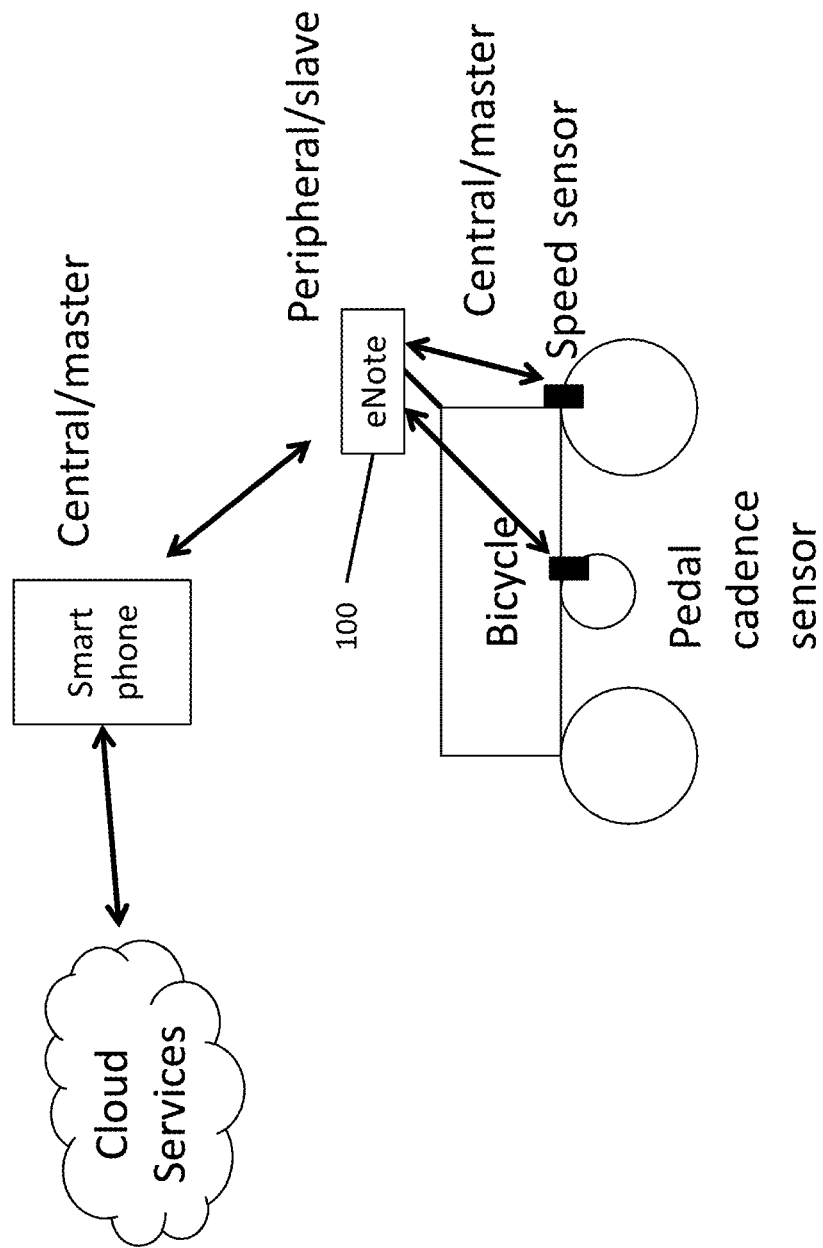
FIGS. 9A-9D schematically illustrate examples of an eNote display device operating in both Central and Peripheral roles.
Figure 9B:
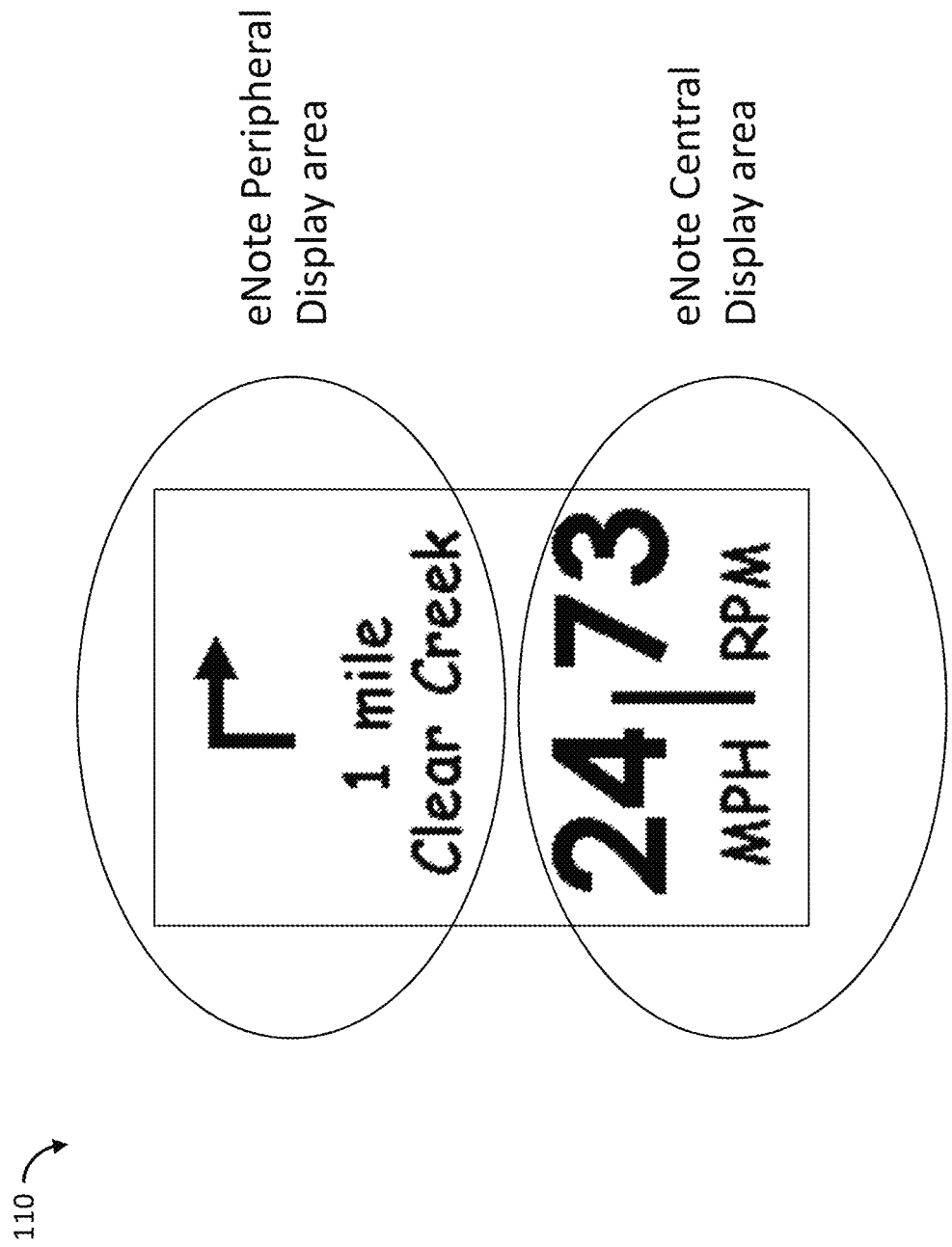
Figure 9C:
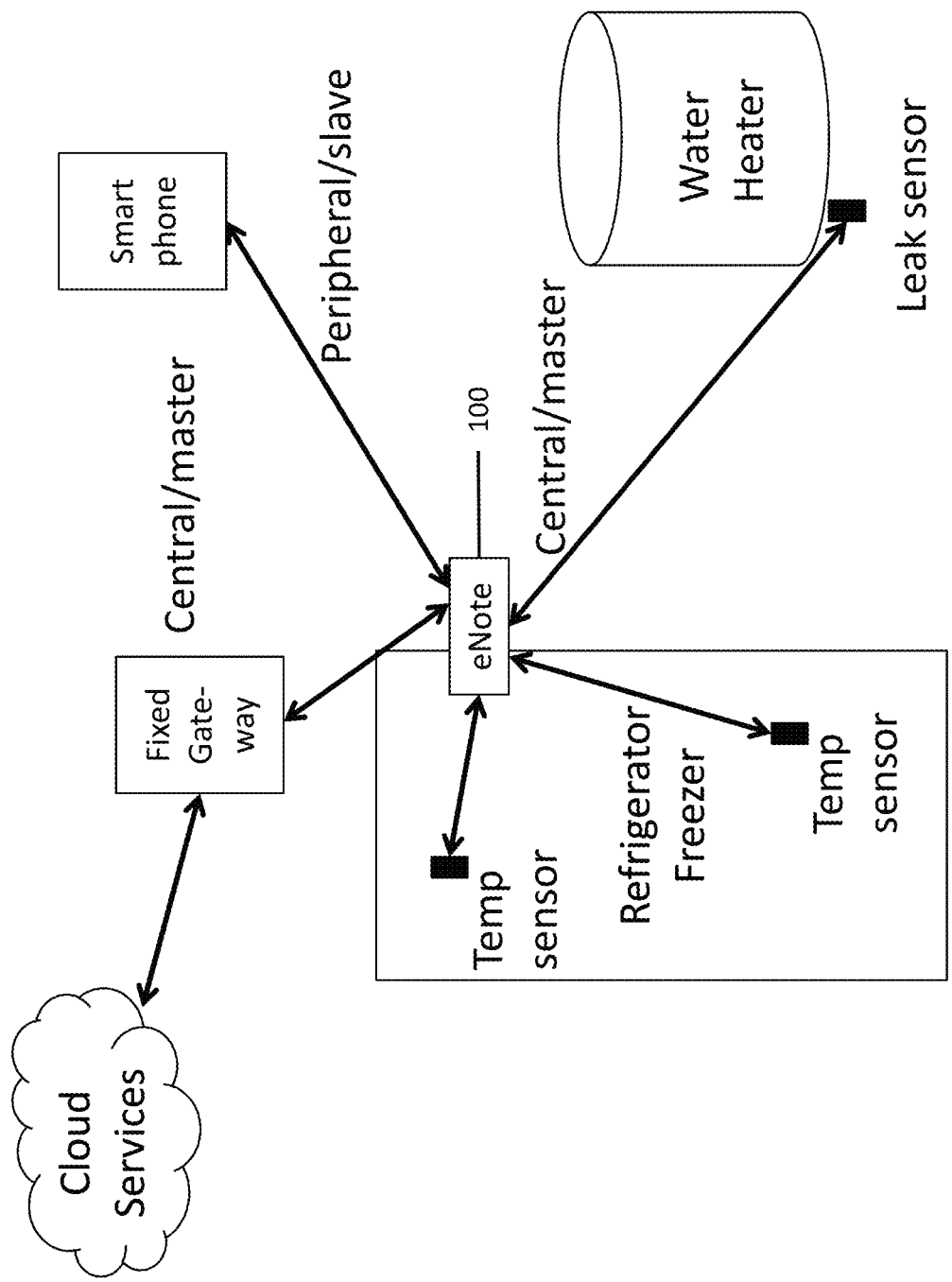
Figure 9D:
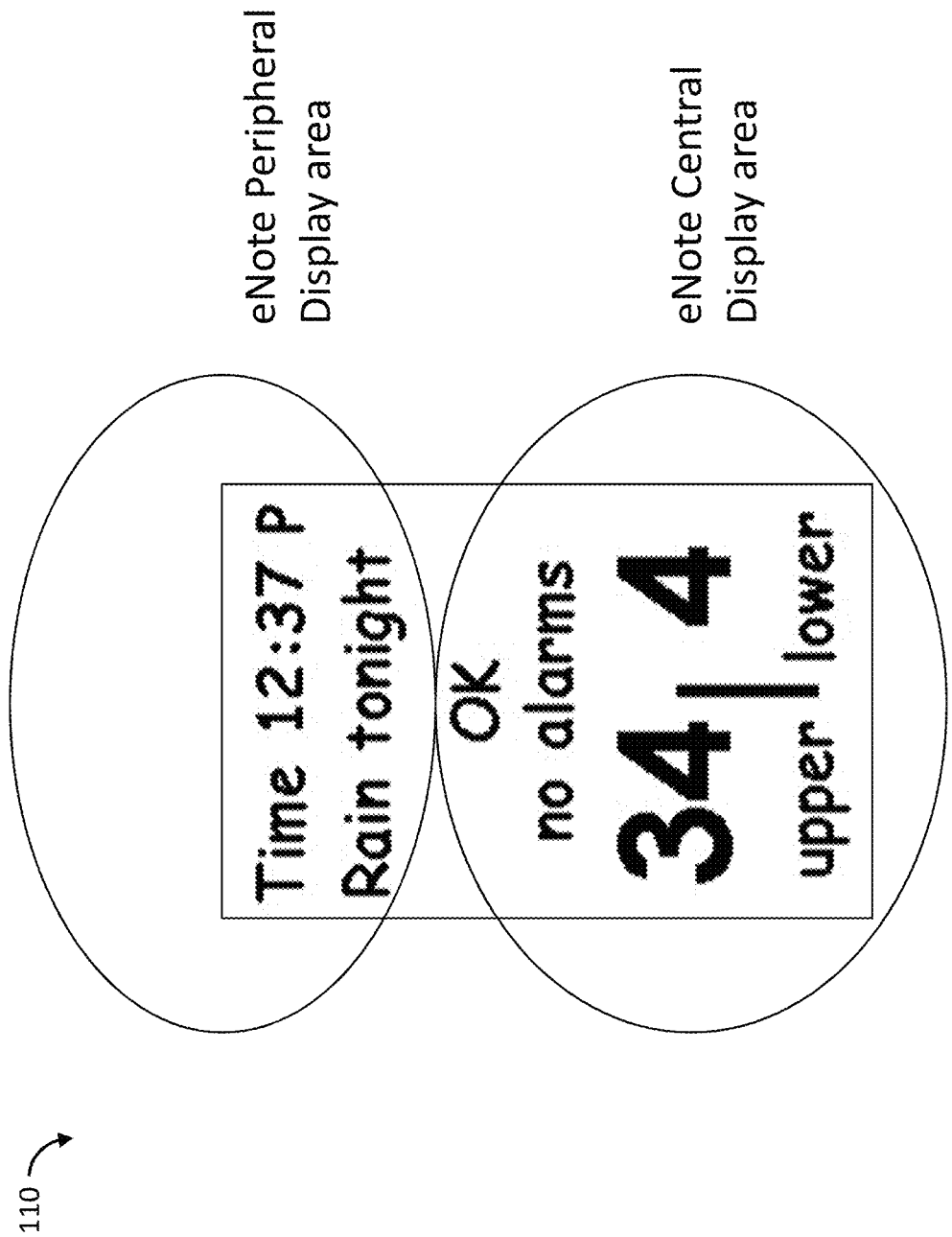

FIGS. 9A-9D schematically illustrate examples of an eNote display device 100 operating in both Central and Peripheral roles. FIGS. 9A and 9C schematically illustrate example use cases for a bicycle and a refrigerator/freezer, respectively. FIGS. 9B and 9D schematically illustrate user interfaces for the bicycle and refrigerator/freezer use cases, respectively.

In FIG. 9A, a bicycle is equipped with sensors for speed of the bicycle and cadence of the pedals. These sensors operate on well-known sensing technologies including, e.g., Hall-effect or optical. These sensors also include BTLE transmission as Peripherals. The eNote device 100 functions as a Central device to these peripheral sensor devices, collecting the data and displaying numeric representations of the data as shown in the example user interface in FIG. 9B, which displays the bicycle speed (in mph) and cadence (in rpm). In other examples, graphical presentations of the data could additionally or alternatively be displayed (e.g., a graph of bicycle speed or cadence versus time or a map or directions received from the smartphone).

Concurrent to the Central operation, the eNote device 100 is operating as a Peripheral to the smartphone and driving the eNote's display to show image or text data received from the smartphone. An area of the eNote display 110 has been configured for this functionality in the upper part of the display 110 shown in FIG. 9B. In this example, the smartphone uses its built-in GPS and connection to the cloud through cellular data technology to provide directions to the user to a route described by the smartphone application.

In the example shown in FIG. 9C, an eNote device 100 is adhered to a household or industrial refrigerator. The eNote device 100 provides capability as a Central to control and collect data from temperature sensors in the refrigerator and freezer sections, as well as a sensor to provide water leak detection for a household or industrial water heater. These three sensors provide alarms to the user and advantageously should be maintained regardless of connection to the cloud, but the cloud provides for remote monitoring and alerting of these conditions as well. These data (e.g., temperatures (° F.) of the refrigerator/freezer sensors) are displayed as shown in the lower area of the display 110 shown in FIG. 9D.

Concurrently, the eNote device can act as a Peripheral to a gateway device that connects the low power BTLE network to an internet connection, as shown in the example in FIG. 9C. Through this connection, a cloud application can push information such as weather forecasts and alerts to a portion of the eNote graphical display reserved for this function. Additionally or alternatively, the gateway device can request information on the status of the refrigerator or water heater sensor network to pass on to other cloud applications such as remote alert service providers. An example of the type of data that can be displayed is shown in the upper area of FIG. 9D.

Note that any/all of these data are displayed in portions of the display for convenience and readability in these examples, but could be located in any area or position or orientation in other implementations of the eNote display device Examples of Tap Position Sensing Embodiments of the eNote device 100 can optionally include one or more motion sensors (e.g., accelerometers) that can be used for various purposes. The accelerometer data can be sensed and processed by the eNote using the SOC microprocessor and then made available via a BTLE Characteristic as an orientation, tap sense, or tap location. For example, in some embodiments, a motion sensor can detect a vibration signal (e.g., from a user tapping the device) and the eNote device can analyze the vibration signal to determine a characteristic of the tap (e.g., a duration, an approximate location, etc.). The eNote device can perform an action based on the characteristic of the tap. For example, the eNote device may interpret the tap as a user input (e.g., an affirmative answer to an inquiry output on the eNote display). In some embodiments, the eNote device may include two (or more) motion sensors, which may allow the eNote device to more accurately estimate the position of the tap via triangulation or trilateration methods (described further herein).

In some implementations, the accelerometers can provide positional information to be used to alter the orientation (e.g., portrait or landscape) or other properties of the displayed information, without the need for an external device to provide changed images.

In another implementation, the accelerometers can be used to provide user input data. For example, one or more accelerometers can be used to provide recognition of a user tapping the display. This gesture could be used with one or more taps in succession to provide simple answers such as "yes" (e.g., one tap) or "no" (e.g., two taps). These detected taps can rely on techniques commonly used for switches such as debouncing. The tap indications may be in response to questions to the user displayed on the eNote display.

Figure 10B:
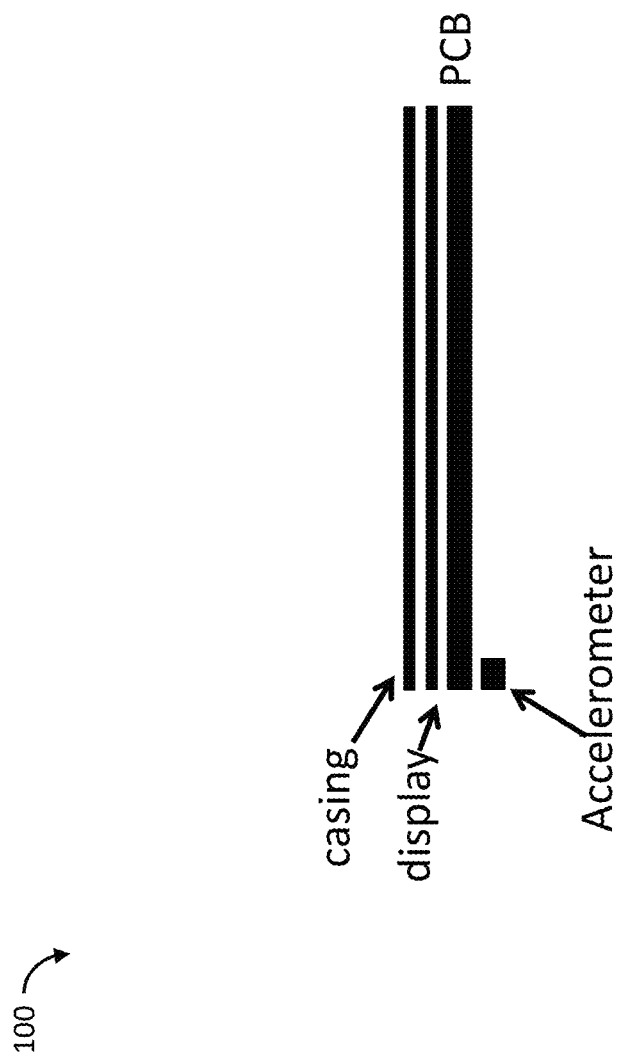

In another implementation, the accelerometers can be used together to provide location of the tap by quantifying characteristics about the timing and amplitude of the vibrations detected on the printed circuit board (PCB) or substrate to which they are mounted. An example of the mounting of the accelerometers and construction of the eNote device 100 is shown in FIG. 10A (top view of the PCB) and FIG. 10B (side view of the PCB, display and housing).

Vibration from a tap will move through the housing and display to the PCB, and/or move laterally through the display and casing materials. The material properties of these layers allow the vibration to propagate through the materials at a speed based on the speed of sound in the materials. Time of flight measurements (from the position of the tap to the position of each accelerometer) can be used to triangulate or trilaterate the position of the tap.

Figure 10C:
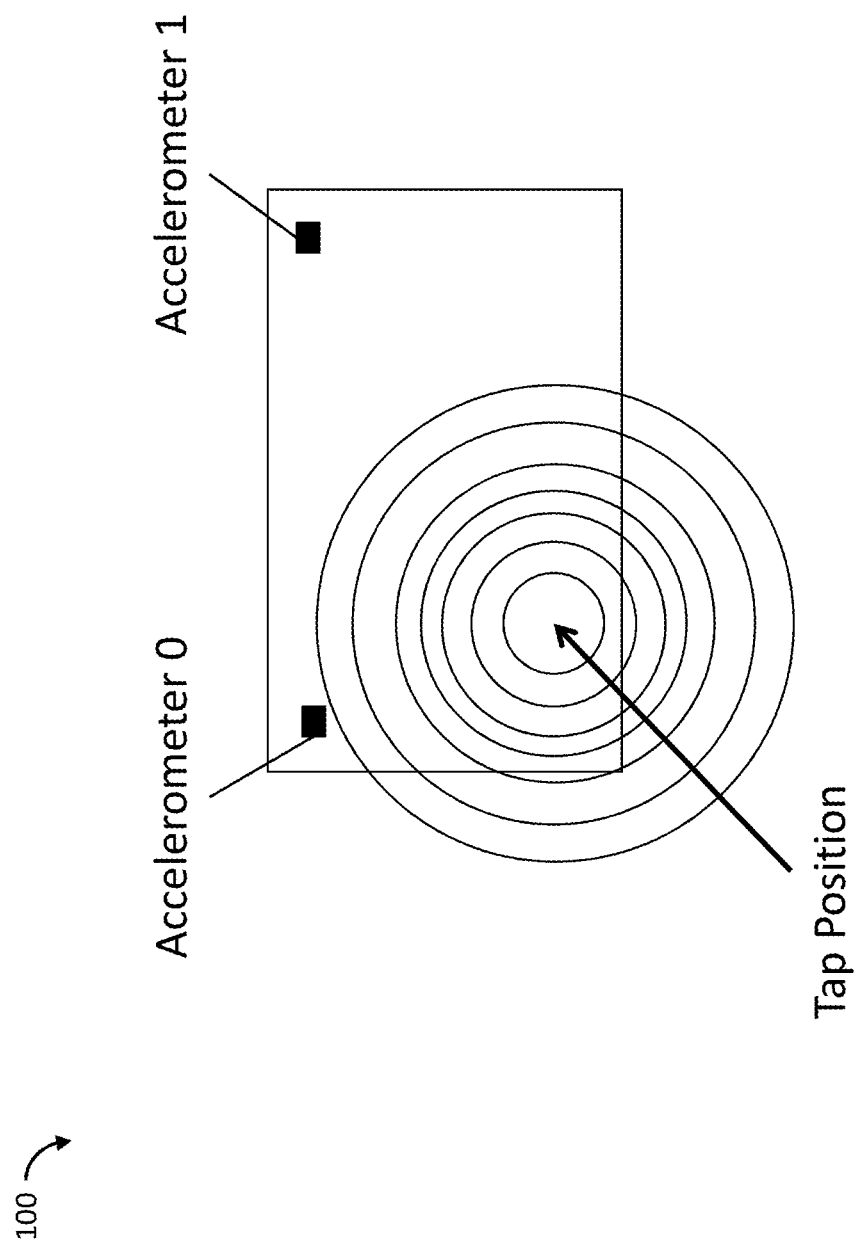
FIGS. 10C and 10D are top views that schematically illustrate an example of using two accelerometers in an eNote device to calculate the position of a tap on the device.
Figure 10D:
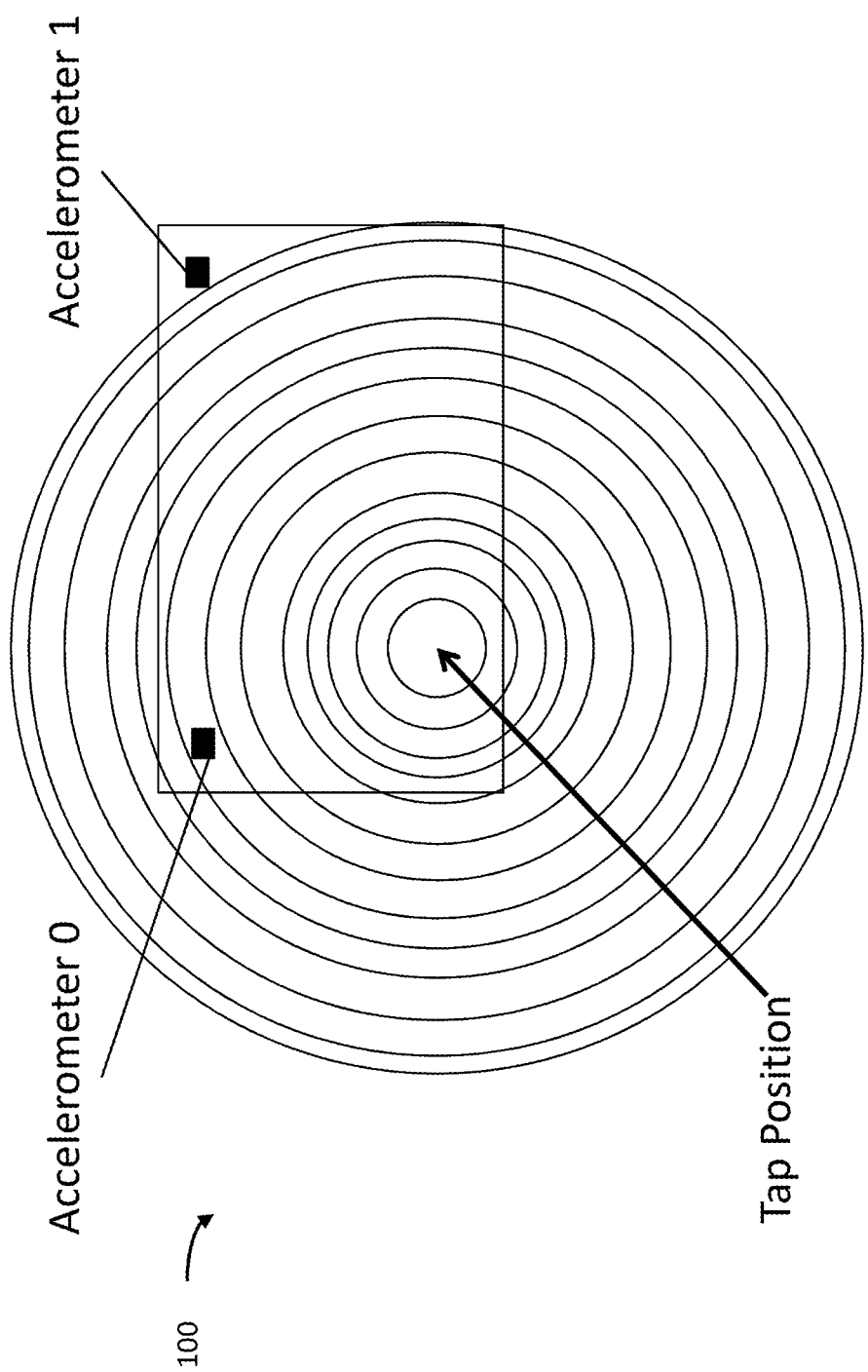

FIGS. 10C and 10D schematically illustrate an example of using two accelerometers in an eNote device 100 to calculate the position of a top on the device. The accelerometers detect different timing and amplitude waveforms based on the position of the tap relative to each accelerometer position. In FIG. 10C, the vibration wave front (shown in concentric circles) propagating from the tap position has reached Accelerometer 0, and a short, but measurable time later it reaches Accelerometer 1 as shown in FIG. 10D. In some embodiments, position of the tap can be calculated using Time Difference Of Arrival (TDOA) techniques. A sample calculation is described for calculation of the time difference. In this example, the speed of sound in the materials through which the tap vibrations propagate is assumed to be 340.29 m/s, a length of the eNote device is 0.0762 m (3.0 in), and the tap is at one edge of the device very close to Accelerometer 0. The time of arrival (TOA) at Accelerometer 0 is approximately 0 s, and the TOA at Accelerometer 1 is about 0.0762 m/340.29 m/s=223.9 µs. In some embodiments, cross correlation of the vibration signals measured by the accelerometers can be used to determine the TDOA and an angle to the tap position relative to one (or the other) accelerometer. In other embodiments, more than two accelerometers can be utilized, and the additional accelerometers can be used to provide even more accurate position estimates for the taps.

Example Features of Certain eNote Implementations

Other displays have utilized back-scatter transmission technology or methods to fit certain particular needs or mechanical fixation requirements. The eNote technology utilizes a standard wireless technology to provide for two-way communication as well as location information in unique combinations to solve problems not envisioned by previous devices, and provides for ubiquitous technologies that allow wide-scale usage of these devices and systems. The eNote utilizes the Bluetooth low energy wireless technology described in Bluetooth 4.0 and supported by subsequent revisions as the RF wireless technology to achieve widespread usability and system configurability.

Bluetooth low energy wireless technology additionally provides mechanisms that many previous devices have focused on as their contribution to the state of the art and have subsequently been abandoned as impractical for implementation and deployment on a wide scale. Some of these devices use of two or more technologies or antennas to achieve similar goals as those provided by Bluetooth low energy technology for Advertising, Secure and simple pairing, Authentication, Encryption, Multi-point transmission, Proximity and micro-location, Connectionless transmission (or receipt) of data (e.g., nonconnectable advertising events), Error correction/detection, or Very low power providing constant advertising on battery power—no need for remote wakeup.

Other devices have used methods for compression of data or elaborate methods for graphical image transmission and local processing. Certain embodiments of eNote utilize none of these, preferring the more general method of transmitting individual pixels (picture elements). This method provides the capabilities for some or all of the following features: different languages and character sets, additional machine-readable elements such as bar codes or QR codes, graphical images such as pictures and logos, and utilization in both horizontal and vertical modes (and automatic compensation for positioning).

In some embodiments, only standard image compression techniques known in the art such as Run Length Encoding (RLE) and similar lossless algorithms are employed to minimize power consumption on the display device, allowing long term battery operation and low cost electronics. Certain eNote system implementations utilize high-cost and high-energy components in the computing device (e.g., mobile platform, fixed gateway or cloud) and transmitting the very simple image information to the display device.

In various embodiments, the following can be provided. A re-writeable Display device includes both human and machine-readable elements and utilizes an RF (wireless) interface to transfer the display image. A re-writeable Display device with RF components can be configured to provide human readable and machine-readable elements and provides proximity and locating information utilizing an RF interface. A re-writeable Display device with RF component can be configured to provide human readable and machine-readable elements and to broadcast configurable information. The configurable information can include a coded identification or a Uniform Resource Identifier (URI) that directs devices to Internet resources.

A re-writeable Display device is described that connects to a networked computing system (e.g., the cloud) through mobile or fixed gateways for transfer of its display image and configuration information. A re-writeable Display device is described that provides connectivity to the networked computing system through mobile or fixed gateways and is configured for display of information and images and communication of the Display device proximity location relative to mobile or fixed position gateways.

A re-writeable Display device is described that provides connectivity to a networked computing system through mobile or fixed position gateways for display of information and communication of fixed and mobile device proximity location relative to the Display device.

In various implementation of any of the Display devices, the device provides direct network addressability or the device may be connected via other devices in a mesh network or other network configuration.

The device can include one or more accelerometers and the device can be configured to provide functionalities including motion detection to provide historical tracking of movement for transmission, position detection to automatically compensate for rotation of the display, user input from user finger taps on the device, or multiple accelerometers to provide calculating position of the tap on the device. The Device can be configured to allow user input to the device using sensors for motion or tap detection to provide historical tracking of movement. The sensors for motion detection (or tap detection) can include accelerometers, magnetometers, gravitometers, gyroscopes, or other motion detection sensors.

The Device can include an e-paper virtually permanent (low power) display technology or an LCD display technology. The Device can include a display that implements bistable or multistable display technology in which virtually no electrical power is used to maintain an image on the display and electrical power is used to change the image. The Device can include light (e.g., LED) annunciator(s) for identification of the unit for pairing and bonding or for user alerts to changes or alarms. The Device can include non-volatile data storage, which can be used to record access history and may provide encryption keys (or other security features) to provide secure access to the device or the data storage.

In various implementations, broadcast information can be turned on or off during operation or the number of authorized connecting devices can be limited. The device can be configured to constantly advertise its presence and identification and unique attributes for long periods of time when operating from non-replaceable, non-rechargeable batteries.

The device can include one or more power sources including rechargeable batter(ies), solar power sources (e.g., solar cell(s)), or other energy harvesting sources. The display can allow display of text in multiple languages using bit-mapped graphics, display of optical machine-readable elements using bit-mapped graphical elements in addition to (or as an alternative to) text, such as bar codes or QR codes. The device can include other output elements including a variable light source (e.g., a blinking light or LED) that can be actuated to vary the light intensity to convey an output signal. The display can output graphical elements to provide information such as links to the web (e.g., an URL) or links to software applications (e.g., app stores).

A system can include any embodiment of the wireless re-writeable display device and a fixed position gateway in bidirectional communication with the display device, in which the display device is configured to provide display of human and machine-readable information from a networked computing system (e.g., the cloud) via the gateway. The device can be configured to provide authentication of a user or mobile device (or gateway) through the combination of visual and electronic techniques.

Embodiments of the Display device can include an RF (wireless) interface to provide updated, revised or completely new functionality via instructions communicated to the RF interface (e.g., Bluetooth low energy device firmware update (DFU) mode).

Various embodiments of a wireless electronic display device comprise a wireless radio frequency transceiver configured to communicate with a first device or a second device, either as a central or a peripheral, and a low-power-consumption electronic display that uses little or no electrical power to maintain an image on the electronic display. The electronic display can be configured to output (1) a human-readable element and/or (2) a machine-readable element. The electronic display can include an area configured to display an image based on information received from either the first device or the second device. The processor can be configured to operate either in a central mode or a peripheral mode, wherein when in the central mode, the electronic display device acts as a master that initiates a connection to the first device, which functions as a slave, and receives the information from the first device. When in the peripheral mode, the electronic display device acts as a slave that advertises to receive a connection request from the second device, and once connected receives the information from the second device. In various embodiments, the electronic display device can operate just as in the central mode, just in the peripheral mode, or substantially concurrently in the central and peripheral modes. The electronic display device can communicate bidirectionally with other devices or unidirectionally with other devices (e.g., when acting as a peripheral, the eNote may transmit undirected advertising events).

CONCLUSION

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include processors, microprocessors, general purpose computers programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A wireless electronic display device comprising:
  a wireless radio frequency transceiver configured to communicate bidirectionally with a first device and a second device;
  a low-power-consumption electronic display that uses little or no electrical power to maintain an image on the electronic display, the electronic display configured to output (1) a human-readable element and (2) a machine-readable element, the electronic display comprising a first area configured to display a first image based on first information received from the first device and a second area configured to display a second image based on second information received from the second device; and
  a processor in communication with the electronic display and the transceiver, the processor configured to operate substantially concurrently in a central mode and a peripheral mode, wherein
    when in the central mode, the electronic display device acts as a master that initiates a connection to the first device and receives the first information from the first device via the connection, and
    when in the peripheral mode, the electronic display device acts as a slave that advertises to receive a connection request from the second device, and once connected receives the second information from the second device.

2. The wireless electronic display device of claim 1, wherein the transceiver is configured to communicate over a short range no more than 100 m.

3. The wireless electronic display device of claim 1, wherein the electronic display comprises a bistable or multistable reflective display.

4. The wireless electronic display device of claim 1, wherein the display comprises a touch-sensitive portion.

5. The wireless electronic display device of claim 1, wherein the human-readable element comprises alphanumeric text and the machine-readable element comprises a bar code or a quick response (QR) code.

6. The wireless electronic display device of claim 1, wherein the first area of the display is separate from the second area of the display.

7. The wireless electronic display device of claim 1, wherein the first device comprises a sensor that broadcasts a data stream.

8. The wireless electronic display device of claim 1, wherein the second device comprises a mobile computing device or a fixed gateway device.

9. The wireless electronic display device of claim 1, further comprising:
  a light source,
  wherein the processor is further configured to modulate the light source to output a second machine-readable element.

10. The wireless electronic display device of claim 1, wherein the electronic display device is configured to transmit a radio frequency signal indicative of a location of the electronic display device.

11. The wireless electronic display device of claim 10, wherein the signal includes an identifier that permits the second device to access a web resource.

12. The wireless electronic display device of claim 10, wherein the signal is transmitted with a signal strength that permits the second device to determine a location of the electronic display device based at least in part on the strength of the signal received at the second device.

13. The wireless electronic display device of claim 1, further comprising a motion sensor.

14. The wireless electronic display device of claim 13, wherein the processor is configured to use information from the motion sensor to determine an occurrence of a tap on the electronic display device.

15. The wireless electronic display device of claim 1, further comprising a non-volatile memory configured to store access history of the electronic display device or encryption keys for access to the electronic display device.

16. The wireless electronic display device of claim 1, wherein the processor is configured to operate substantially concurrently in the central mode and the peripheral mode via time-division or frequency-division multiplexing.

17. An electronic display system comprising the wireless electronic display device of claim 1 in combination with the first device, or the second device, or the first device and the second device.

18. A wireless electronic display device comprising:
a wireless radio frequency transceiver;
a low-power-consumption electronic display that uses little or no electrical power to maintain an image on the electronic display, the electronic display configured to output (1) a human-readable element or (2) a machine-readable element;
a first motion sensor; and
a processor in communication with the electronic display, the transceiver, and the first motion sensor, the processor configured to:
receive a first vibration signal from the first motion sensor; and
analyze the first vibration signal to determine the occurrence of a tap on the electronic display device.

19. The wireless electronic display device of claim 18, wherein the processor is configured to estimate a location of the tap on the electronic display device.

20. The wireless electronic display device of claim 18, wherein the processor is configured to perform an action in response to the determination of the occurrence of the tap.

21. The wireless electronic display device of claim 18, wherein the transceiver is configured to communicate over a short range no more than 100 m.

22. The wireless electronic display device of claim 18, wherein the electronic display comprises a bistable or multistable reflective display.

23. The wireless electronic display device of claim 18, wherein the human-readable element comprises alphanumeric text and the machine-readable element comprises a bar code or a quick response (QR) code.

24. The wireless electronic display device of claim 18, wherein the processor is further configured to operate substantially concurrently in a first mode and in a second mode, wherein
when in the first mode, the electronic display device advertises its presence to other nearby devices, and
when in the second mode, the electronic display device scans for the presence of other nearby devices that are advertising.

25. The wireless electronic display device of claim 24, wherein the processor is configured to operate substantially concurrently in the first mode and in the second mode via multiplexing.

26. The wireless electronic display device of claim 18, further comprising:
a light source,
wherein the processor is further configured to modulate the light source to output a second machine-readable element.

27. The wireless electronic display device of claim 18, wherein the electronic display device is configured to transmit a radio frequency signal indicative of a location of the electronic display device.

28. The wireless electronic display device of claim 18, further comprising a second motion sensor, and wherein the processor is further configured to:
receive a second vibration signal from the second motion sensor; and
analyze the first vibration signal and the second vibration signal to estimate a location of the tap on the electronic display device.

29. The wireless electronic display device of claim 28, wherein the processor is configured to estimate the location of the tap using a time difference of arrival technique.

30. The wireless electronic display device of claim 28, wherein the processor is configured to estimate the location of the tap using a triangulation technique or a trilateration technique.

31. The wireless electronic display device of claim 28, wherein the first motion sensor and the second motion sensor each comprise an accelerometer.

32. The wireless electronic display device of claim 28, wherein the processor is further configured to use the estimated location of the tap to determine a user input.

33. The wireless electronic display device of claim 28, wherein the processor is further configured to:
receive a third vibration signal from the first motion sensor;
receive a fourth vibration signal from the second motion sensor; and
analyze the third vibration signal and the fourth vibration signal to estimate a location of a second tap on the electronic display device.

34. The wireless electronic display device of claim 33, wherein the processor is further configured to use the estimated location of the tap and the estimated location of the second tap to determine a user input.

35. A wireless electronic display device comprising:
a wireless radio frequency transceiver;
a low-power-consumption electronic display that uses little or no electrical power to maintain an image on the electronic display, the electronic display configured to output (1) a human-readable element or (2) a machine-readable element;
a motion sensor; and
a processor in communication with the electronic display, the transceiver, and the motion sensor,
wherein the electronic display device is configured to:
transmit a connectionless advertising event.

36. The wireless electronic display device of claim 35, wherein the electronic display is configured to output an image with information associated with the advertising event.

37. The wireless electronic display device of claim 35, wherein the electronic display device is configured to scan for an advertisement transmitted by another device.

38. The wireless electronic display device of claim 37, wherein the electronic display is configured to output an image with information associated with the advertisement from the other device.

39. The wireless electronic display device of claim 35, wherein the electronic display device is further configured to transmit a connectable advertising event and to establish a connection to another device.

40. The wireless electronic display device of claim 35, wherein the transceiver is configured to communicate over a short range no more than 100 m.

41. The wireless electronic display device of claim 35, wherein the electronic display comprises a bistable or multistable reflective display.

42. The wireless electronic display device of claim 35, wherein the human-readable element comprises alphanumeric text and the machine-readable element comprises a bar code or a quick response (QR) code.

43. The wireless electronic display device of claim 35, wherein the processor is configured to use information from the motion sensor to determine an occurrence of a tap on the electronic display device.

* * * * *